United States Patent
Hoare et al.

(10) Patent No.: US 10,674,872 B2
(45) Date of Patent: Jun. 9, 2020

(54) HAND HELD MIXING DEVICE

(71) Applicant: Breville Pty Limited, Alexandria, NSW (AU)

(72) Inventors: Richard Hoare, Lane Cove (AU); Garth Ryan, Helensburgh (AU)

(73) Assignee: BREVILLE PTY LIMITED, Alexandria, New South Wales (AU)

(*) Notice: Subject to any disclaimer, the term of this patent is extended or adjusted under 35 U.S.C. 154(b) by 0 days.

(21) Appl. No.: 15/120,116

(22) PCT Filed: Feb. 19, 2015

(86) PCT No.: PCT/AU2015/000090
§ 371 (c)(1),
(2) Date: Aug. 18, 2016

(87) PCT Pub. No.: WO2015/123723
PCT Pub. Date: Aug. 27, 2015

(65) Prior Publication Data
US 2017/0055775 A1  Mar. 2, 2017

(30) Foreign Application Priority Data

Feb. 19, 2014 (AU) ............................. 2014900531

(51) Int. Cl.
*A47J 43/06* (2006.01)
*A47J 43/044* (2006.01)

(52) U.S. Cl.
CPC ...... *A47J 43/06* (2013.01); *A47J 2043/04418* (2013.01)

(58) Field of Classification Search
CPC .... A47J 43/06; A47J 43/0755; A47J 43/0761; A47J 2043/04418

USPC .......................................................... 366/129
See application file for complete search history.

(56) References Cited

U.S. PATENT DOCUMENTS

| | | | | |
|---|---|---|---|---|
| 2,275,878 A | * | 3/1942 | Allenby | A47J 43/044 310/73 |
| 3,198,490 A | * | 8/1965 | Jepson | A47J 43/044 366/344 |
| 3,725,624 A | * | 4/1973 | Emmons | A47J 43/044 200/569 |
| 2007/0133342 A1 | | 6/2007 | Gili et al. | |
| 2008/0198693 A1 | * | 8/2008 | Lameiro Vilarino | A47J 43/0705 366/286 |
| 2009/0084274 A1 | * | 4/2009 | Kovacic | A47J 43/0766 99/492 |

(Continued)

FOREIGN PATENT DOCUMENTS

| | | | |
|---|---|---|---|
| DE | 1021986 B | 1/1958 | |
| EP | 1967105 A1 * | 9/2008 | ............. A47J 43/06 |
| WO | WO-2014/0124859 A1 | 8/2014 | |

OTHER PUBLICATIONS

Machine translation of EP 1967105, accessed via https://worldwide.espacenet.com on Aug. 6, 2018.*

(Continued)

*Primary Examiner* — Marc C Howell
(74) *Attorney, Agent, or Firm* — Marshall, Gerstein & Borun LLP

(57) ABSTRACT

A hand mixer has a detection mechanism for discriminating between beaters and other rotating accessories. The operation of the mixer may be altered depending on the type of accessory that is detected.

25 Claims, 19 Drawing Sheets

(56) References Cited

U.S. PATENT DOCUMENTS

2012/0014207 A1* 1/2012 Lee .................. A47J 43/082
366/100
2013/0192477 A1* 8/2013 Hoare ................ A47J 36/32
99/486

OTHER PUBLICATIONS

Extended European Search Report for EP Application No. 15752343.2, dated Nov. 8, 2017.
International Search Report and Written Opinion for PCT/AU2015/000090, dated Apr. 2, 2015.
International Preliminary Report on Patentability for PCT/AU2015/000090, dated Aug. 23, 2016.
Second Office Action issue in Chinese Patent Application No. 201580015261.3, dated Jan. 8, 2019.

* cited by examiner

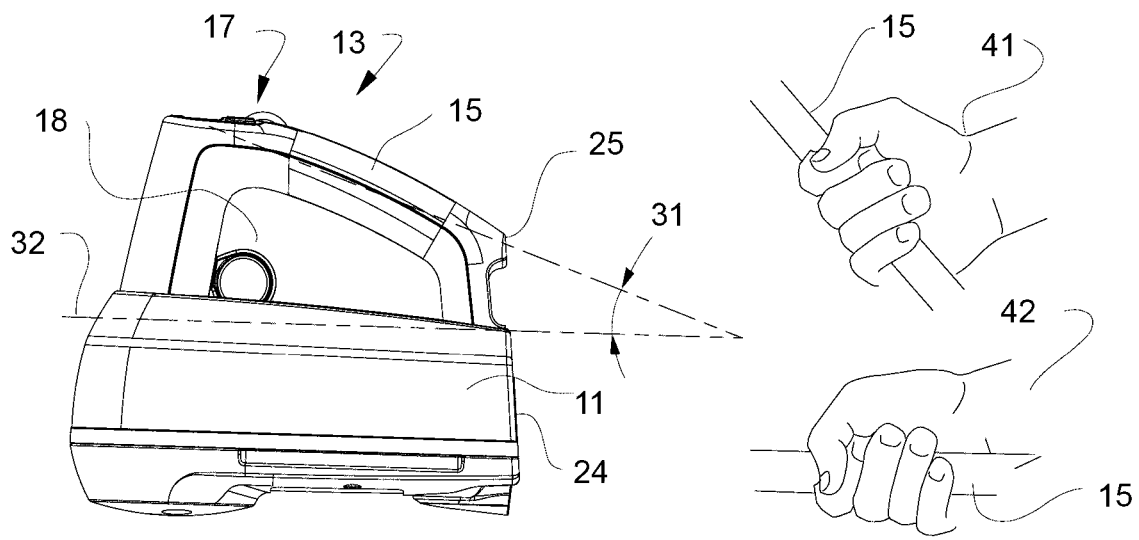
FIG. 3
FIG. 4
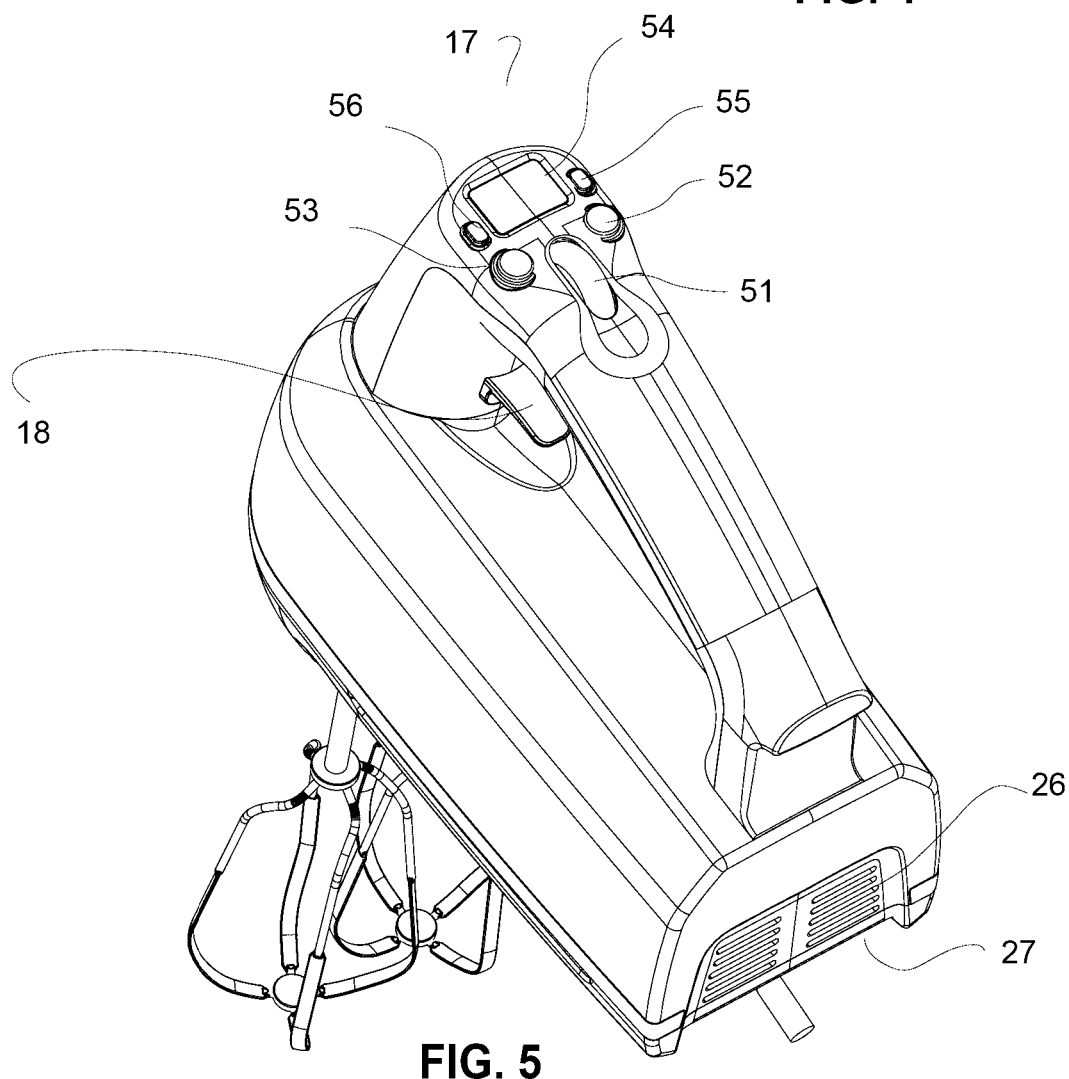
FIG. 5

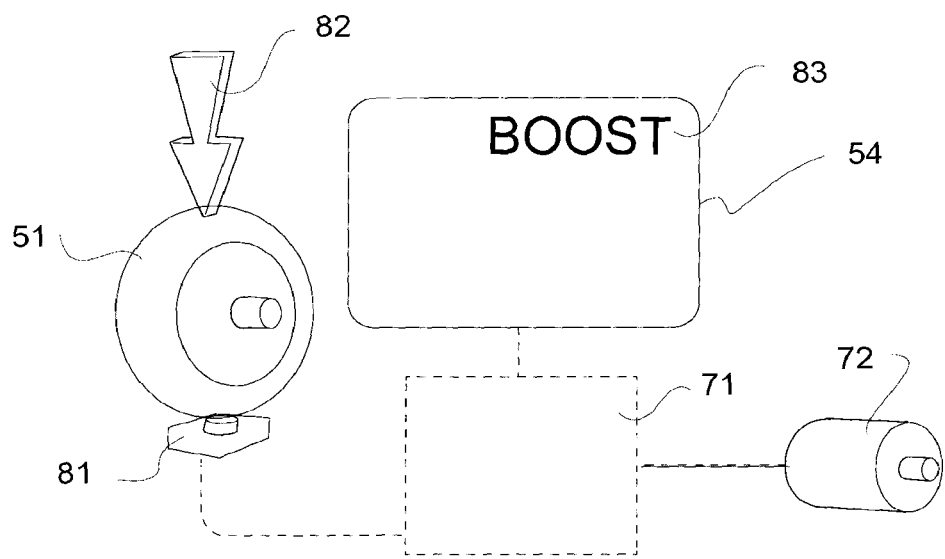
FIG. 8
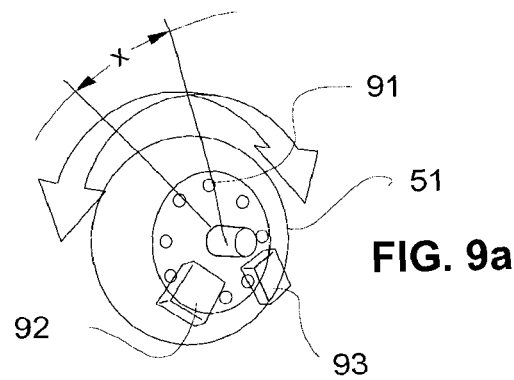
FIG. 9a
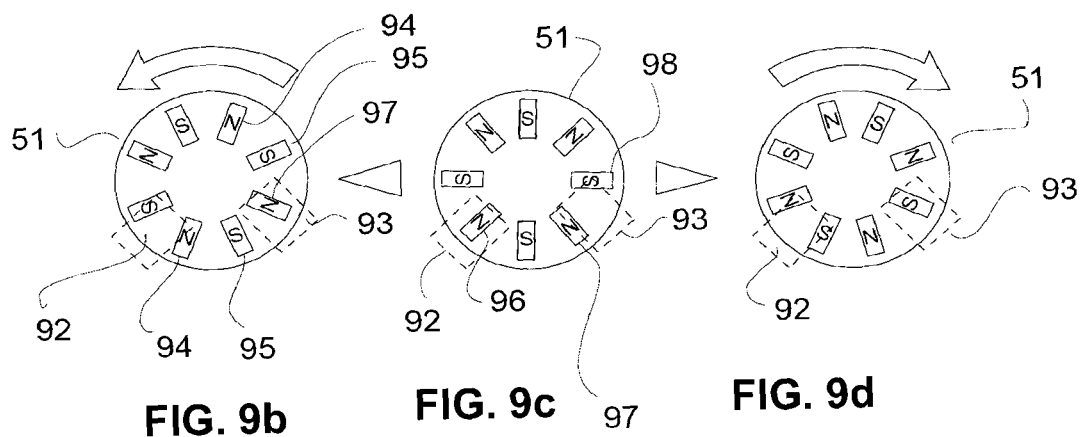
FIG. 9b     FIG. 9c     FIG. 9d

HAND HELD MIXING DEVICE

FIELD OF THE INVENTION

The invention relates to mixers and more particularly to an electric hand mixer for domestic kitchen use.

BACKGROUND OF THE INVENTION

A domestic hand mixer has an electric motor that drives a pair of rotating beaters. The beaters are removable. The body of the hand mixer is generally suspended below a handle. Consumers seek a hand mixer that is comfortable in the hand, is convenient and is easy to control and adapted to co-operate with a range of accessories. Hand mixers can benefit from improved cooling, improved lighting and more sophisticated interaction with its beaters and accessories. The present invention addresses these concerns as well as providing other improvements to hand mixers.

SUMMARY OF THE INVENTION

The present technology provides a hand mixer with conveniently located controls and operating features.

The present technology also provides a handle which is inclined with respect to a nominal horizontal access of the mixer's body.

The present technology provides a hand mixer with one or more sources of illumination located so as to illuminate the area in which the beaters operate.

The present technology also provides a beater release trigger that is conveniently located below the hand grip.

The present technology also provides an air inlet that is located behind the beaters, the inlet co-operating with an internal air channel that provides a flow of air to an intake fan located in a front area of the housing.

The present technology also provides a thumb operated controller located adjacent to a graphic display and other user controls.

The present technology can also provide means for determining which of a plurality of beater types is inserted into the beaters sockets.

The present technology provides a beater ejection mechanism adapted to co-operate with beaters having identification features. The present technology also provides a hand mixer that can co-operate with a food processor or stick mixer accessory.

The present technology also provides beaters with over moulded scraper blades.

The present technology also provides a carrying case for mixer accessories which is adapted to snap-fit onto and below the mixer body.

BRIEF DESCRIPTION OF THE DRAWING FIGURES

In order that the invention be better understood, reference is now made to the following drawing figures in which:

FIG. 3 is a side elevation of a hand mixer.

FIG. 4 is a perspective view of how a hand may grip a handle of a mixer.

FIG. 5 is a top perspective view of a hand mixer showing the user interface.

FIG. 8 is a schematic diagram illustrating a vertically reciprocating scroll wheel interacting with a switch that provides information to the MCU regarding the motor's boost function.

FIG. 9 (a)-(d) illustrate the working of the scroll wheel and exemplary Hall sensors.

Figure 10:
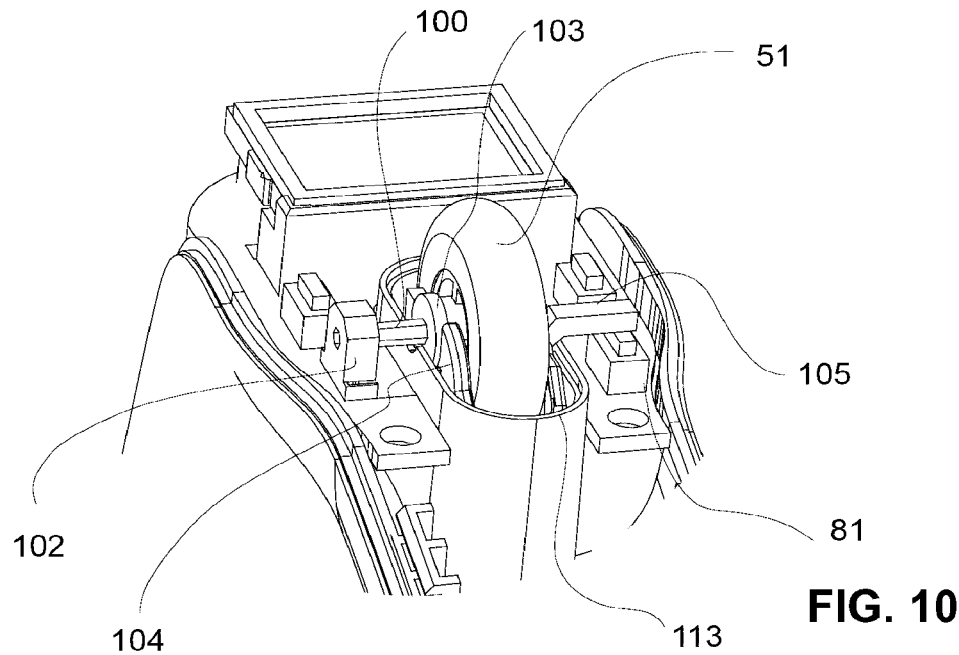

FIG. 10 is a perspective view of the scroll wheel and encoder.

Figure 11:
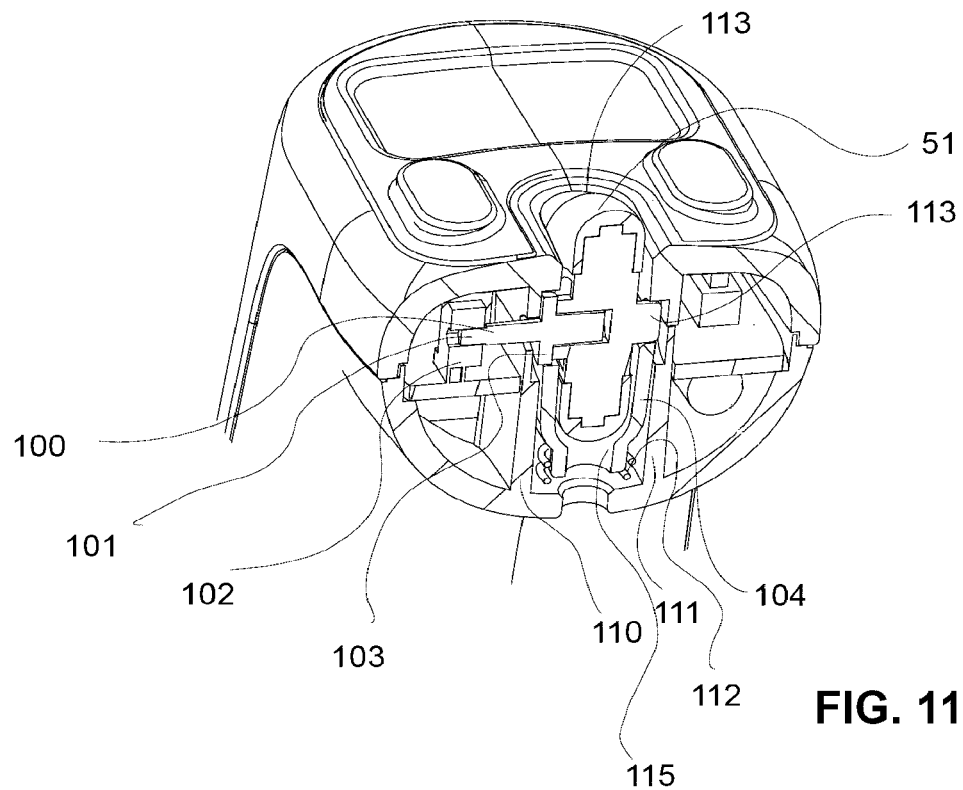

FIG. 11 is a partially sectioned cross-section of the scroll wheel.

Figures 12, 13A:
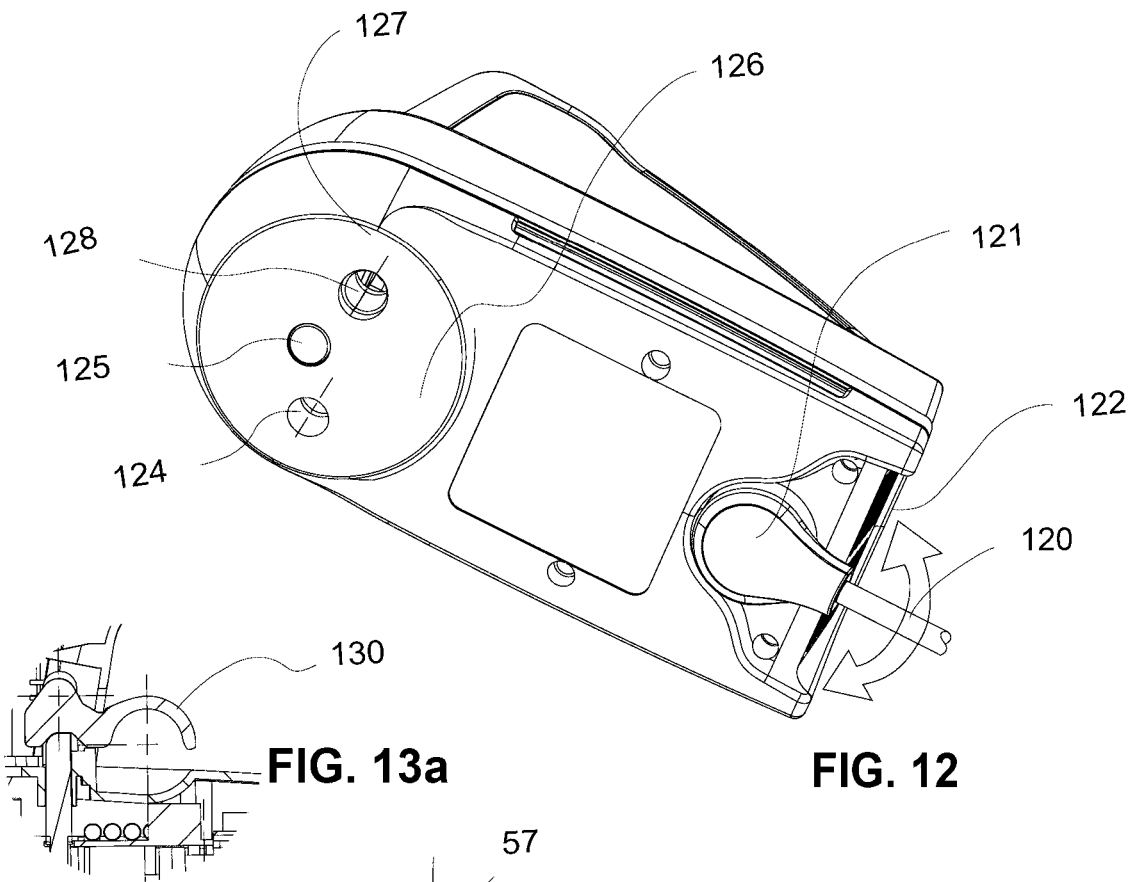

FIG. 12 is an underside perspective of a hand mixer.

Figure 13:
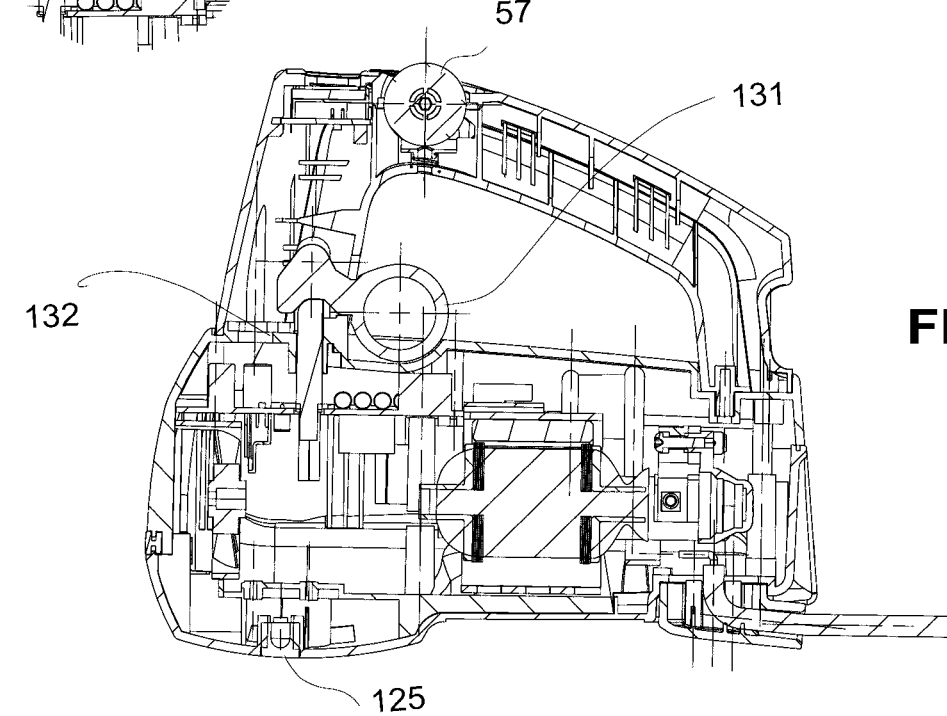
Figure 13B:
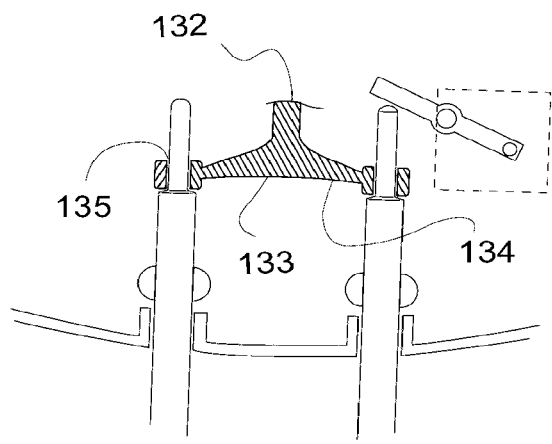

FIG. 13 is a cross-section of the hand mixer depicted in FIG. 12.

FIG. 13 (a) is a detailed view of an ejection trigger.

FIG. 13 (b) is a front elevation of an ejection mechanism.

Figure 14:
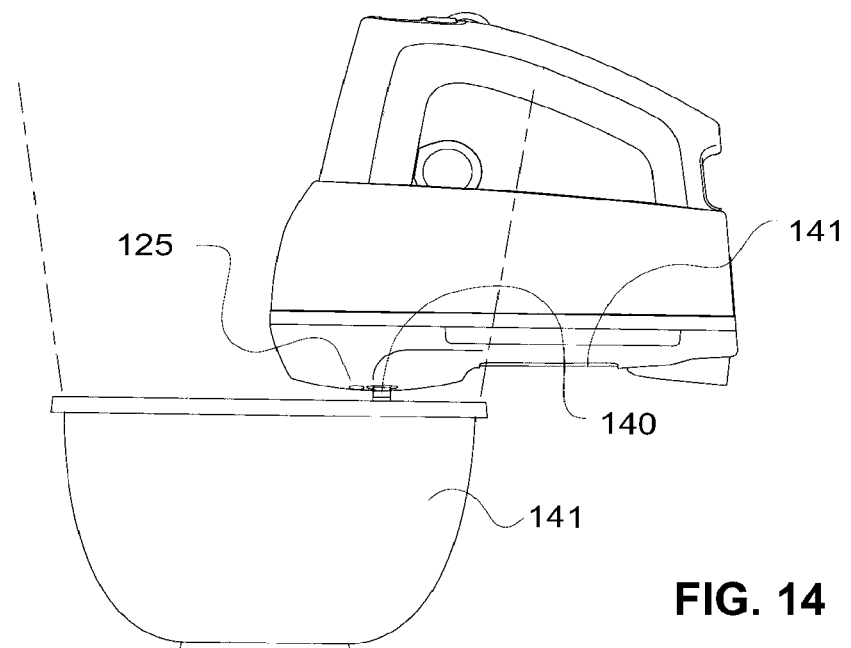

FIG. 14 is a side elevation of a hand mixer and bowl illustrating the air intake and illumination features.

Figure 15:
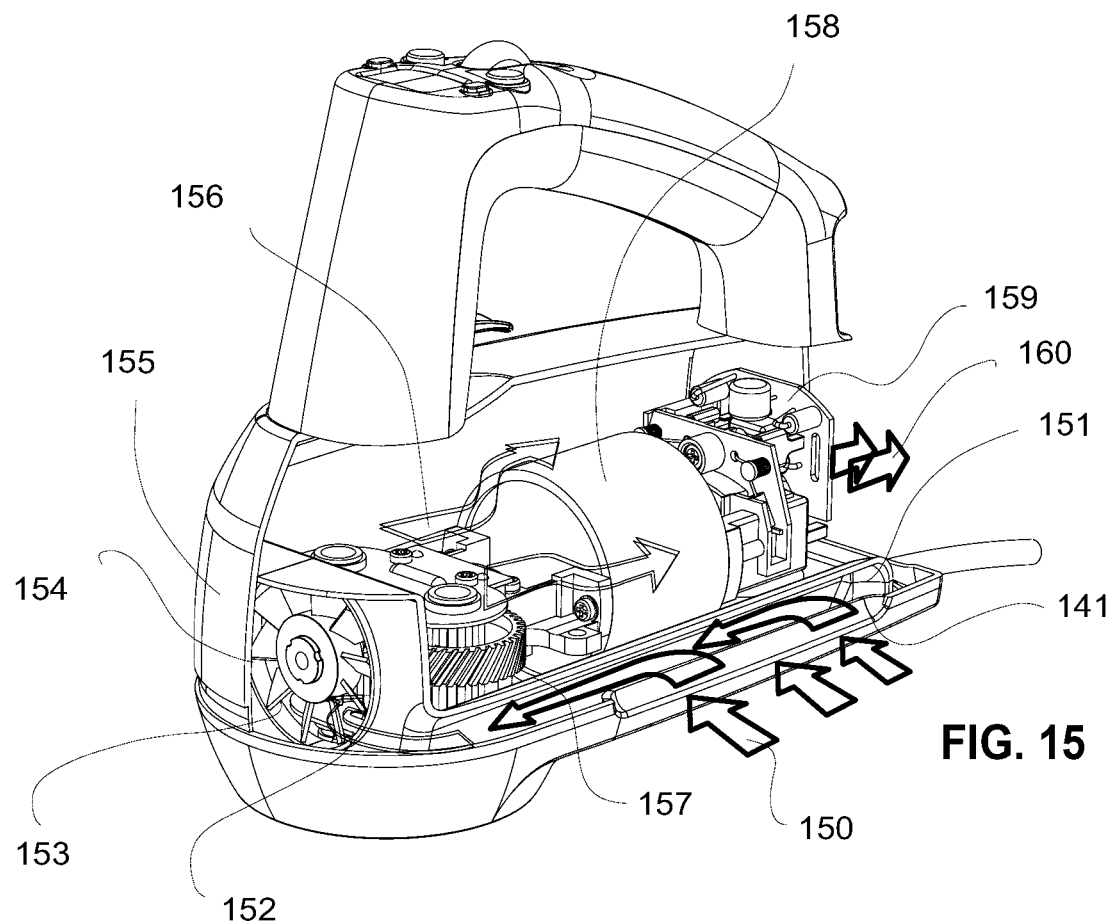
Figure 15A:
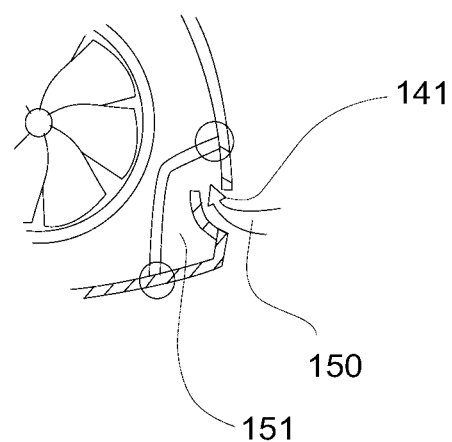

FIG. 15 is a perspective view, partially sectioned to illustrate the air intake and airflow within the device.

FIG. 15 (a) is a cross-section through the air channel depicted in FIG. 15.

Figure 16:
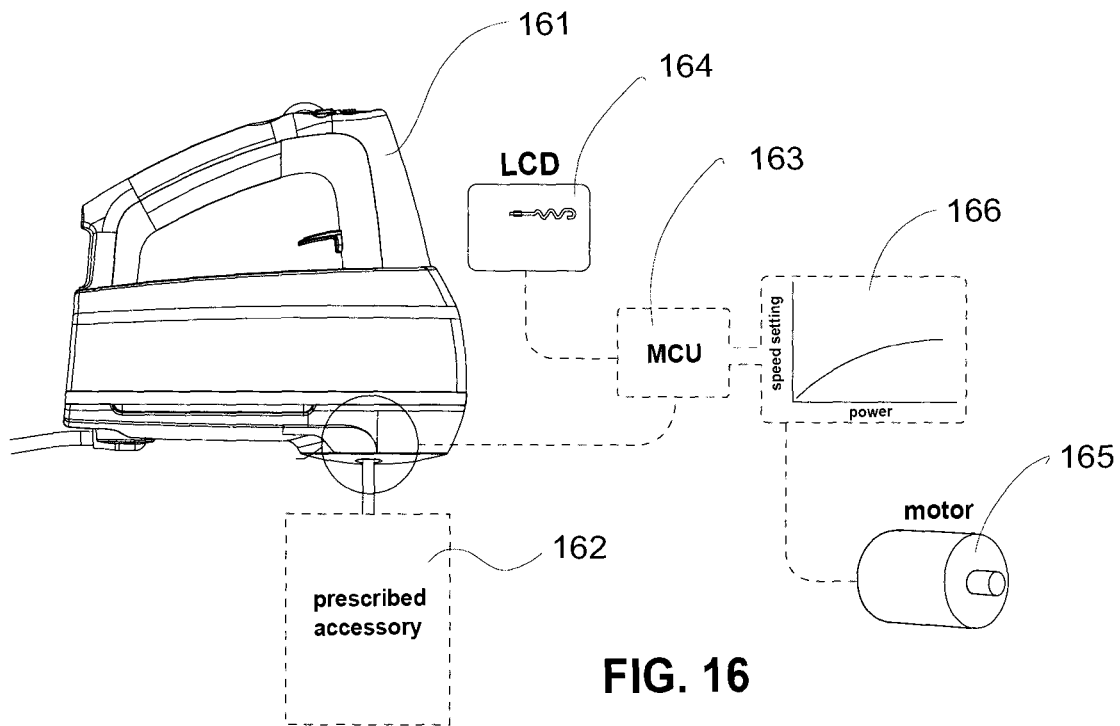

FIG. 16 is a schematic diagram illustrating the MCU's role in detecting an accessory and controlling the motor accordingly.

Figure 17:
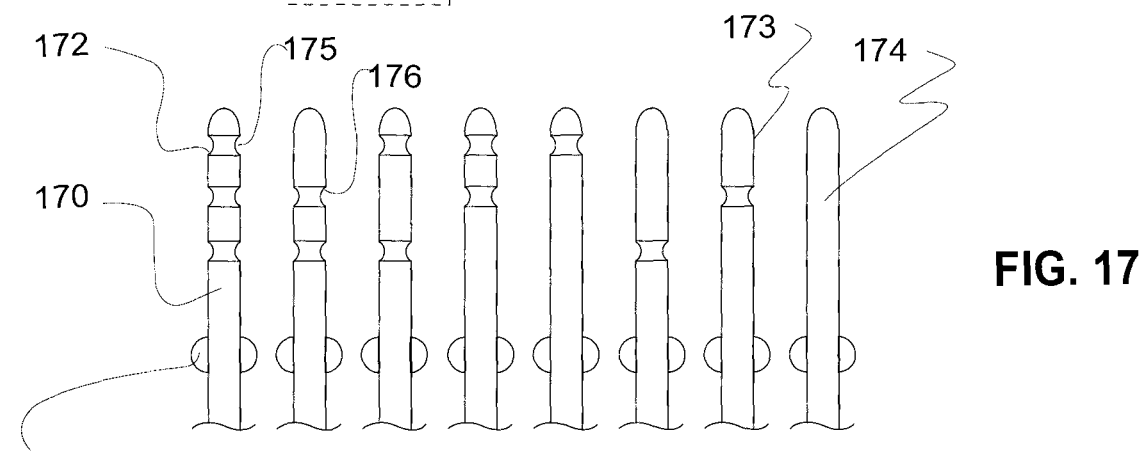

FIG. 17 are front elevations of accessory shafts.

Figure 18:
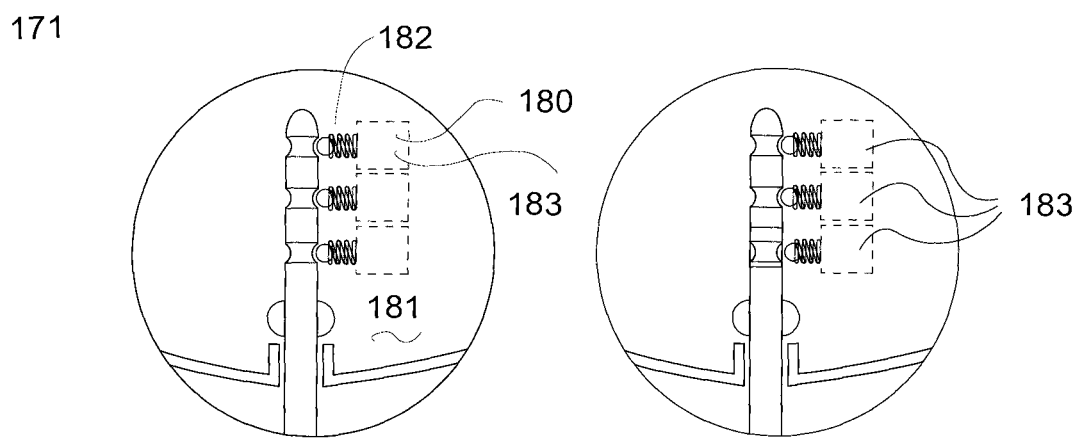

FIG. 18 illustrates accessory sensing by mechanical means.

Figure 19:
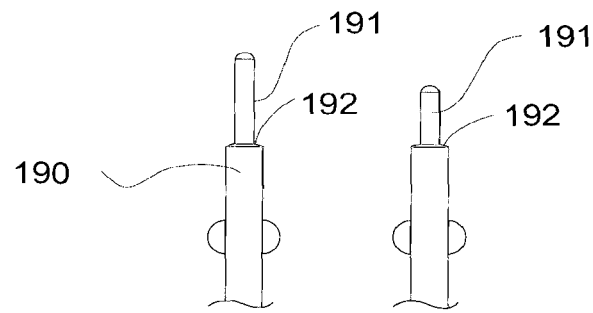

FIG. 19 is a front elevation of accessories with extensions for identification.

Figures 20, 20A:
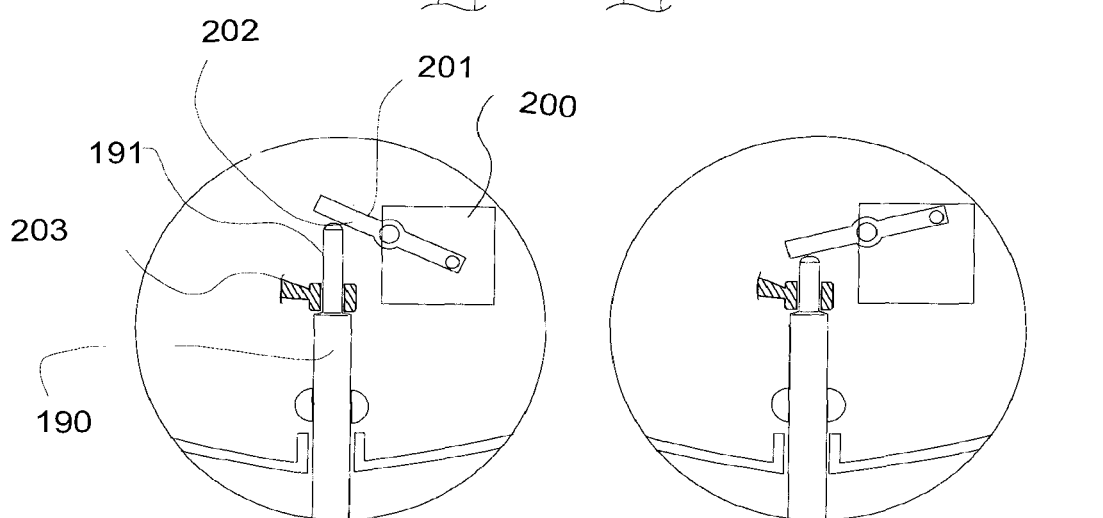

FIG. 20 is a cross-sectional view of an interior of a hand mixer illustrating accessory detection by mechanical means.

FIG. 20 (a) is a cross-sectional view of an interior of a hand mixer illustrating accessory detection by mechanical means.

Figures 21, 21A:
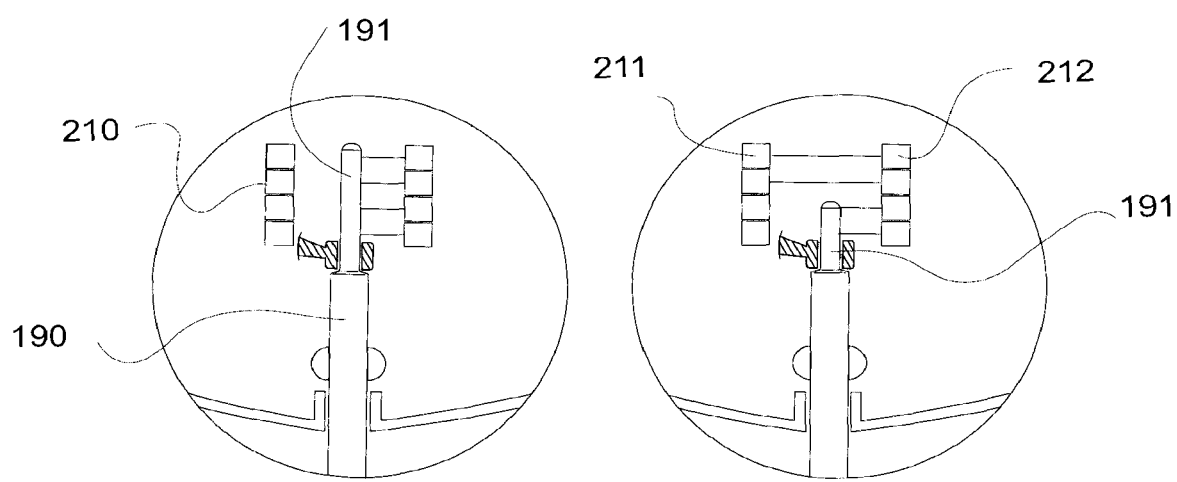

FIG. 21 is a cross-sectional view of an interior of a hand mixer illustrating accessory detection by optical means.

FIG. 21 (a) is a cross-sectional view of an interior of a hand mixer illustrating accessory detection by optical means.

Figure 22:
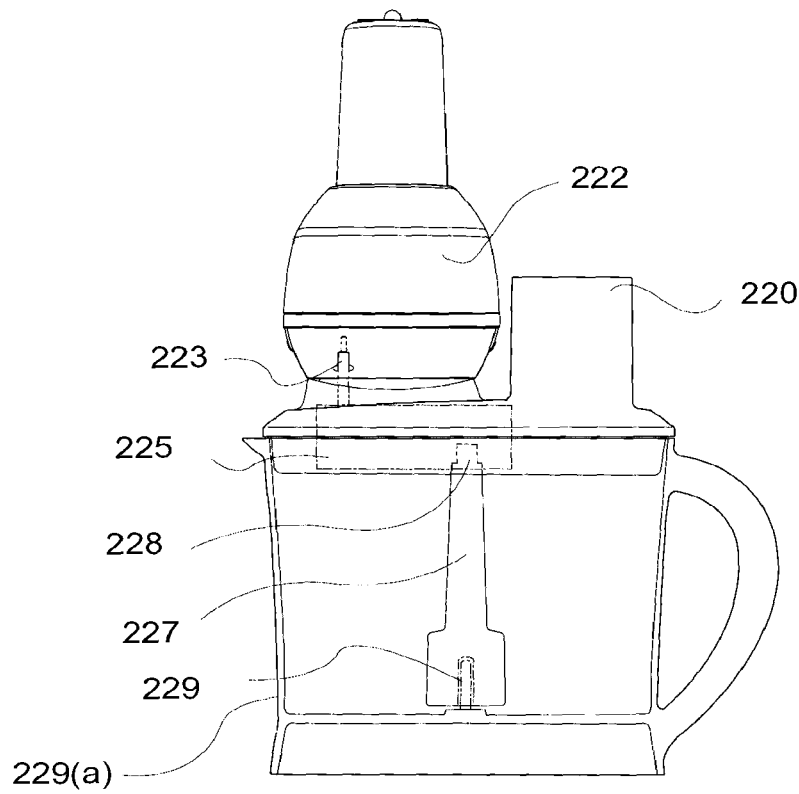
Figure 22A:
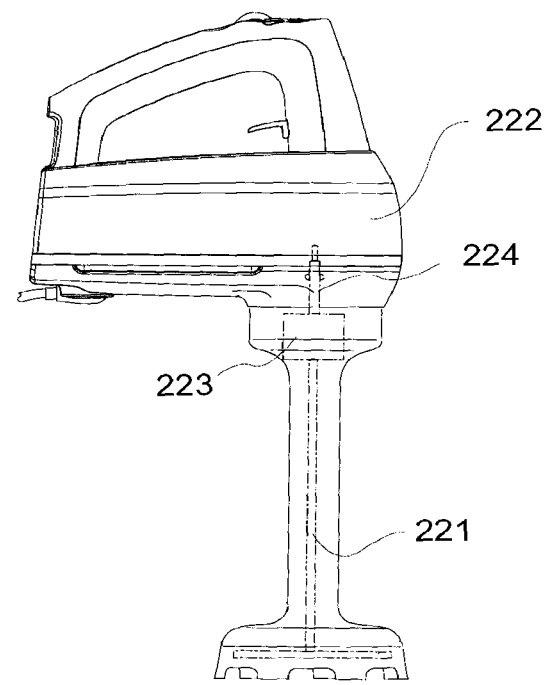

FIG. 22 is a side elevation of a hand mixer cooperating with and driving a food processor.

FIG. 22 (a) is a side elevation of a hand mixer driving a stick mixer accessory.

Figure 23:
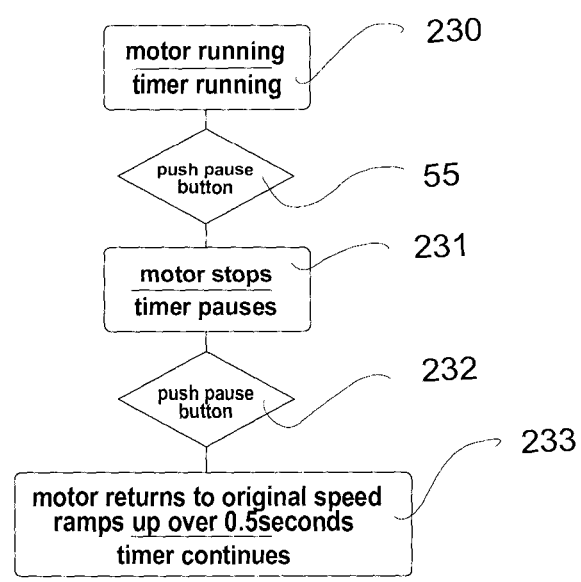

FIG. 23 is a flow chart illustrating the functionality of a pause button.

Figure 24:
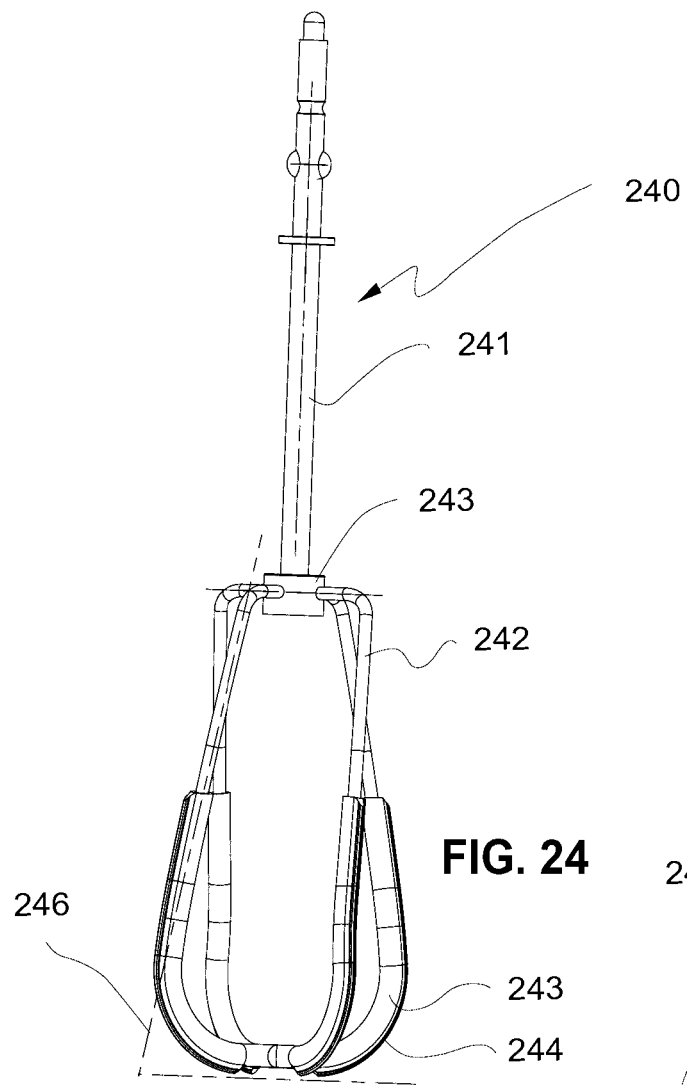

FIG. 24 is a side elevation of a hand mixer accessory.

Figure 25:
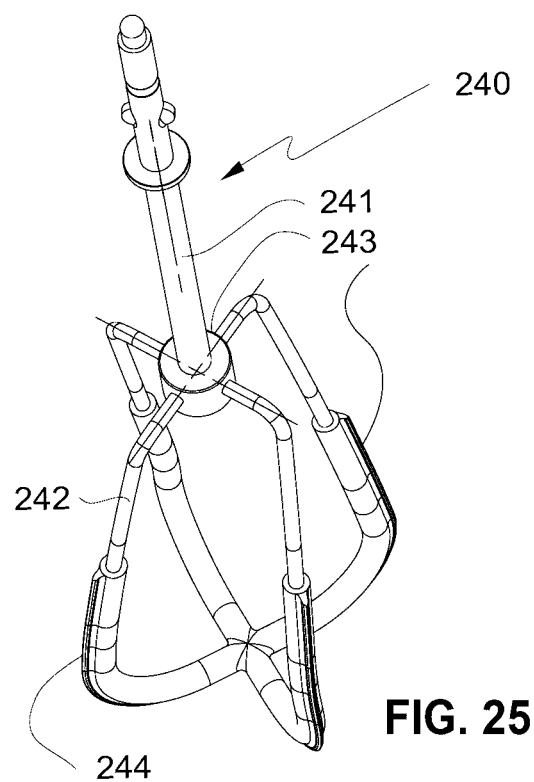

FIG. 25 is a top perspective view of the accessory depicted in FIG. 24.

Figure 26:
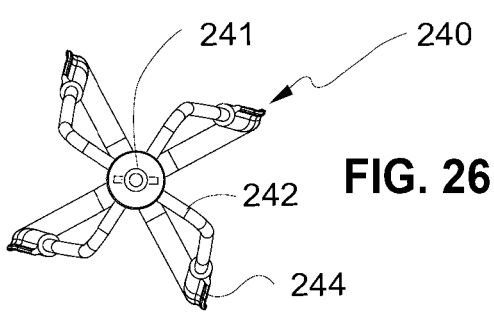

FIG. 26 is a top plan view of the accessory depicted in FIGS. 24 and 25.

Figure 27:
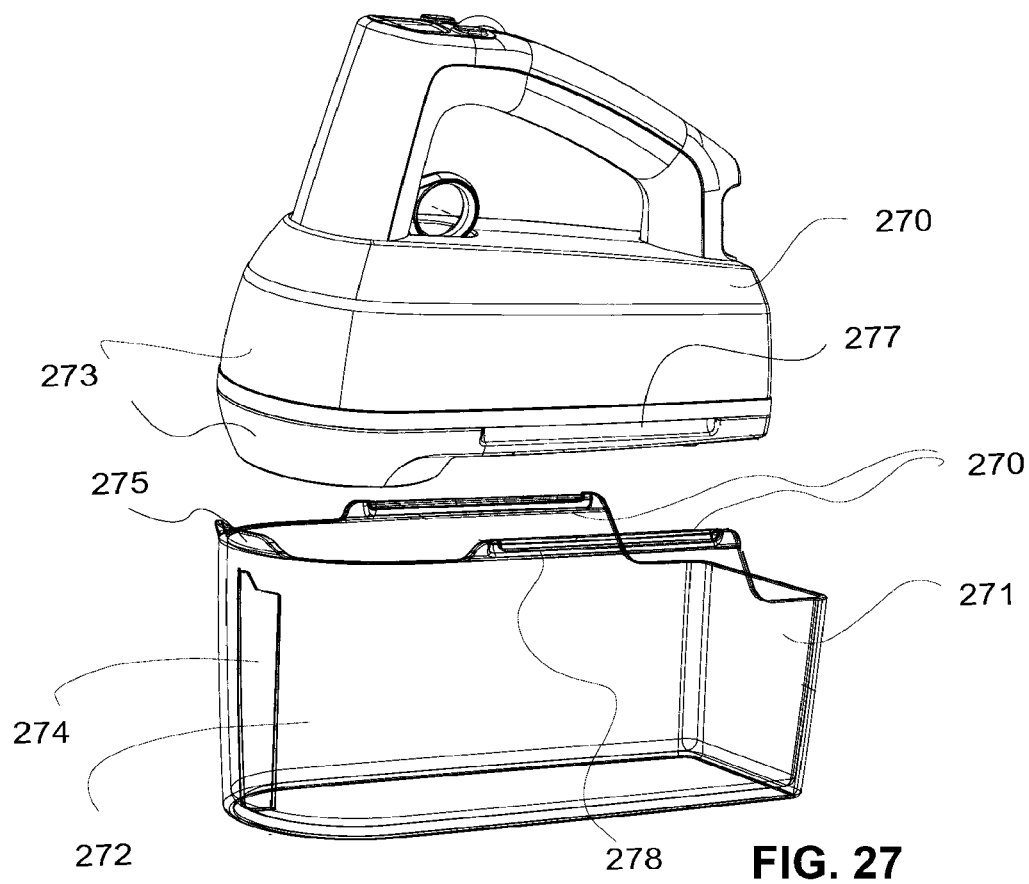

FIG. 27 is a perspective view of a hand mixer and accessory case.

Figure 28:
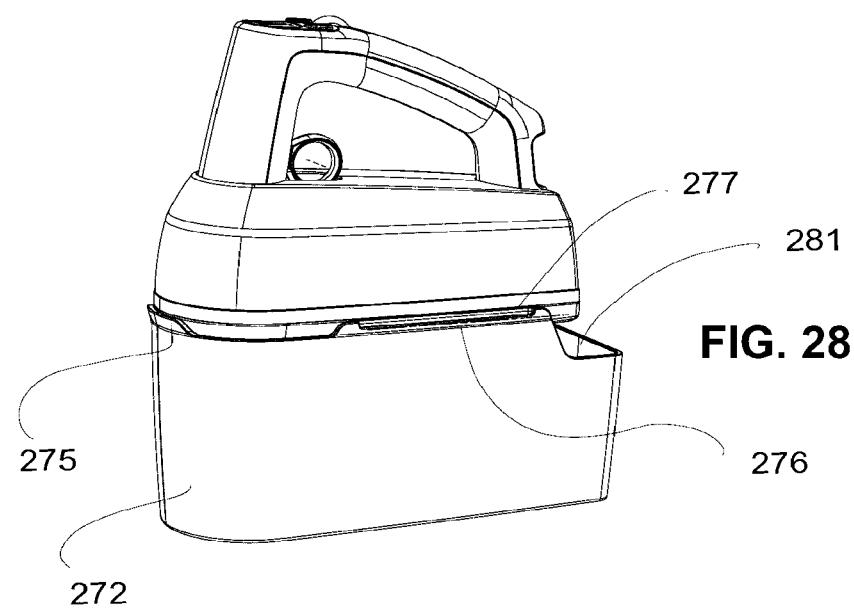

FIG. 28 is a perspective view of a hand mixer and accessory case.

Figures 29, 30, 31:
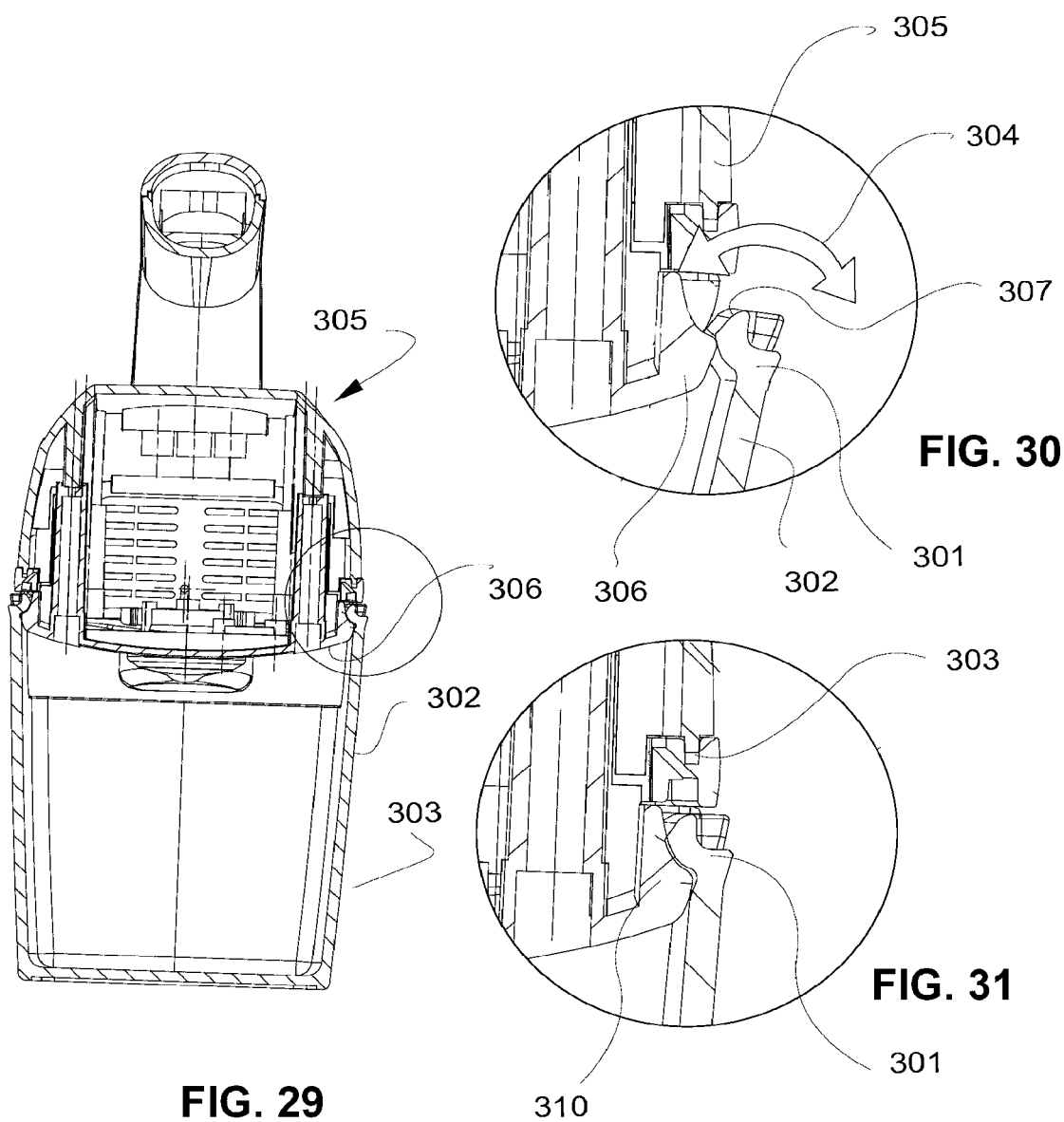

FIG. 29 is a cross-sectional view of a mixer connected to its accessory case.

FIG. 30 is a cross-sectional view of the interconnection between a hand mixer and its accessory case.

FIG. 31 is a cross-sectional view of the interconnection between a hand mixer and its accessory case.

Figure 32:
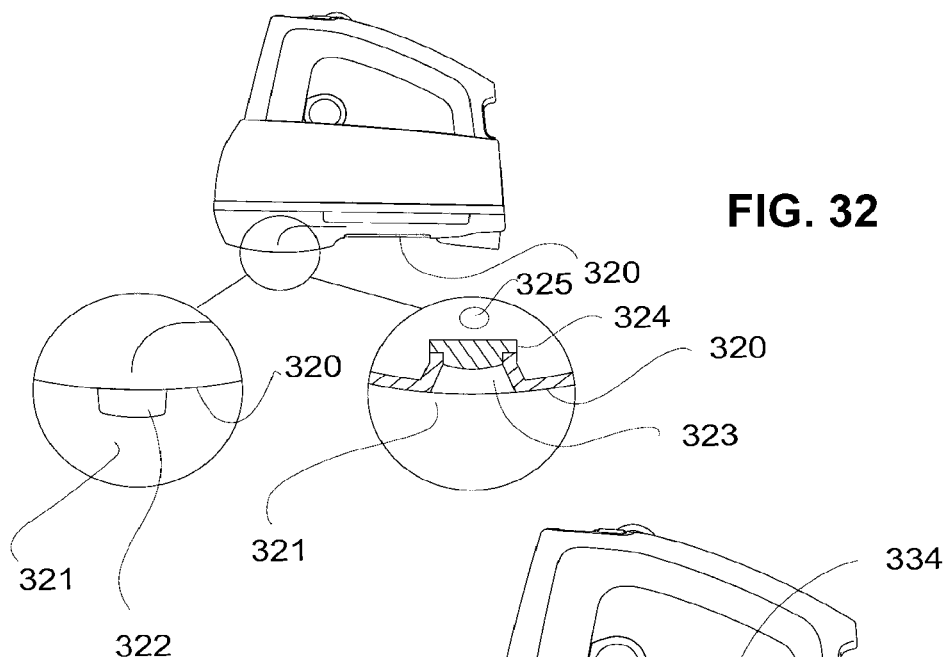

FIG. 32 is a side elevation of a mixer with detailed views of recessed and protruding illuminators.

Figure 33:
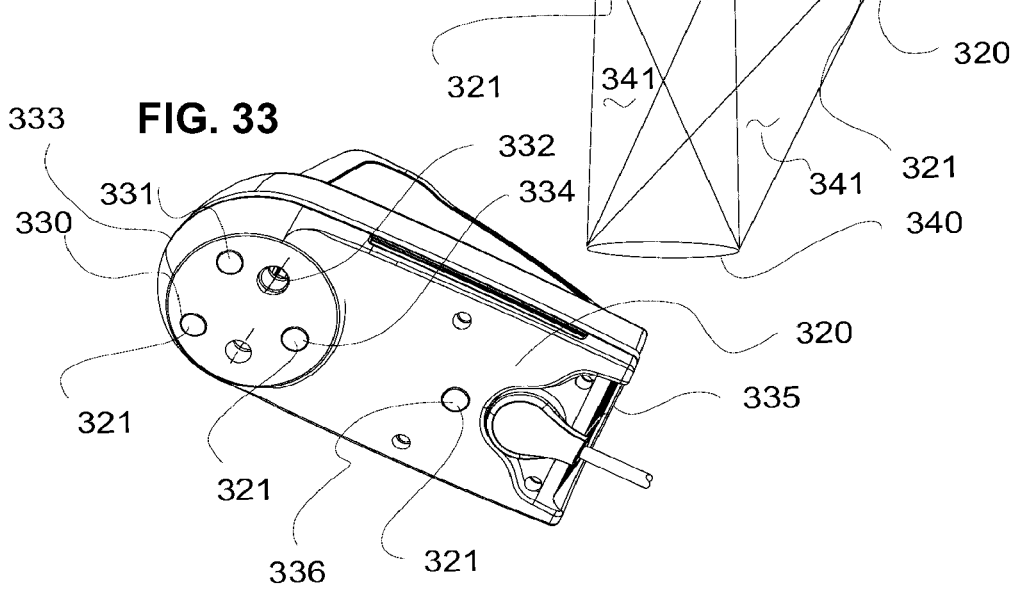

FIG. 33 is an underside perspective view showing multiple illuminators on an underside of a mixer.

Figure 34:
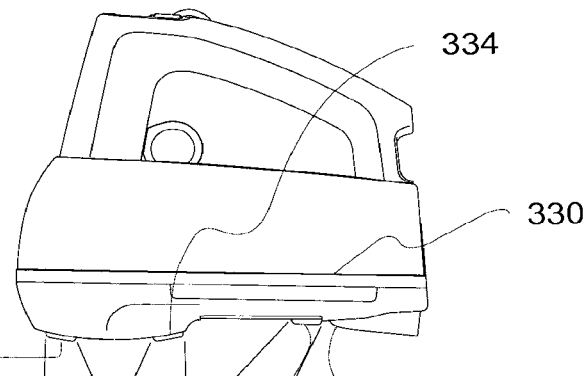

FIG. 34 is a side elevation of a mixer having multiple illuminators, showing different light paths converging on an illumination area.

Figure 35:
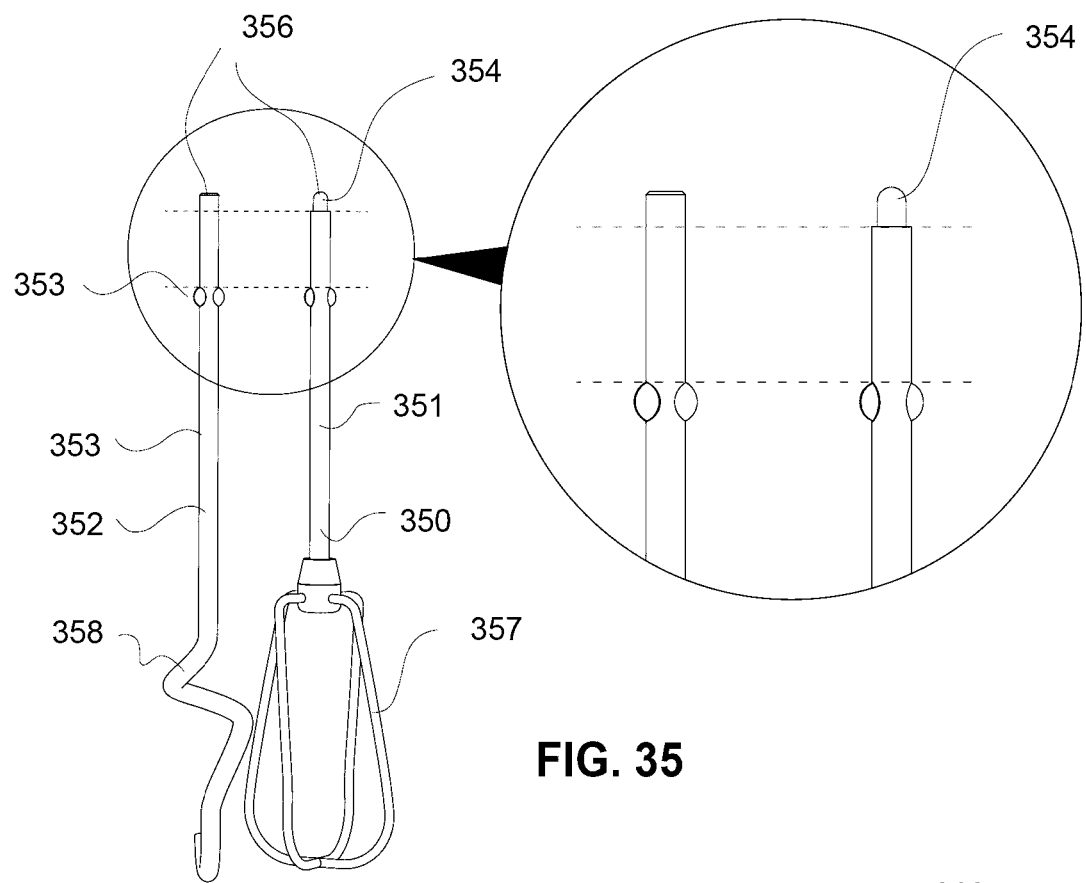

FIG. 35 is a plan view of a beater and a dough hook accessory.

Figure 36:
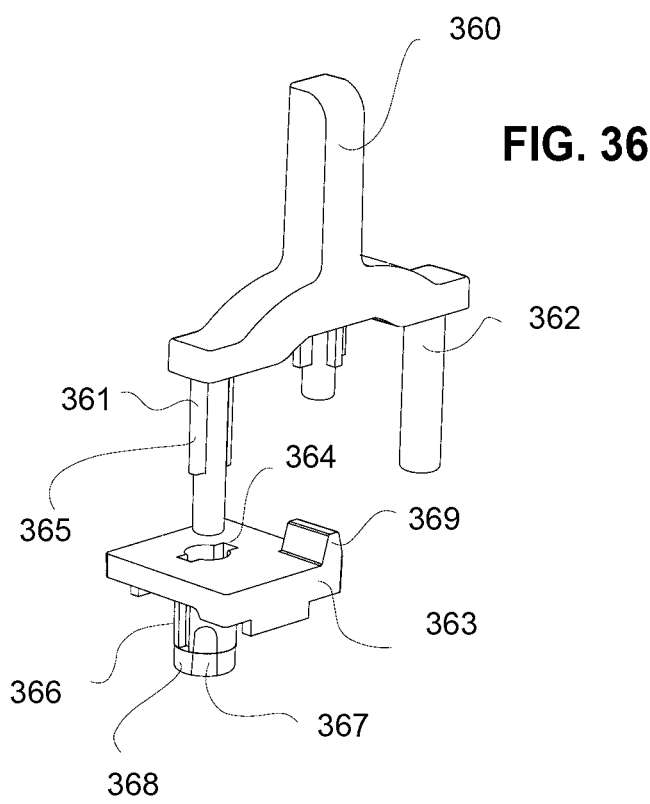

FIG. 36 is an exploded perspective view of a yolk of an ejection mechanism and an actuator associated with that yolk.

Figure 37:
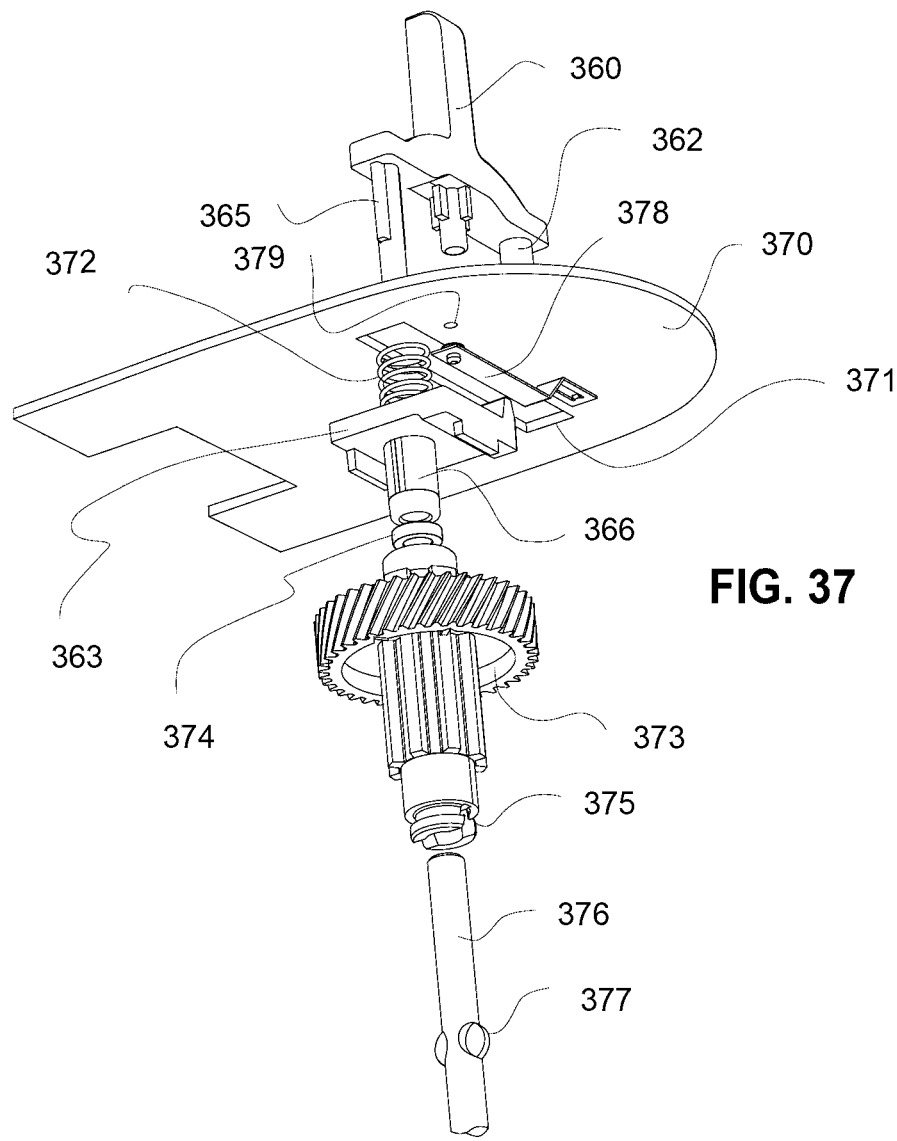

FIG. 37 is an exploded perspective view of a geared hub, its actuator, the printed circuit board and the ejection yolk.

Figure 38:
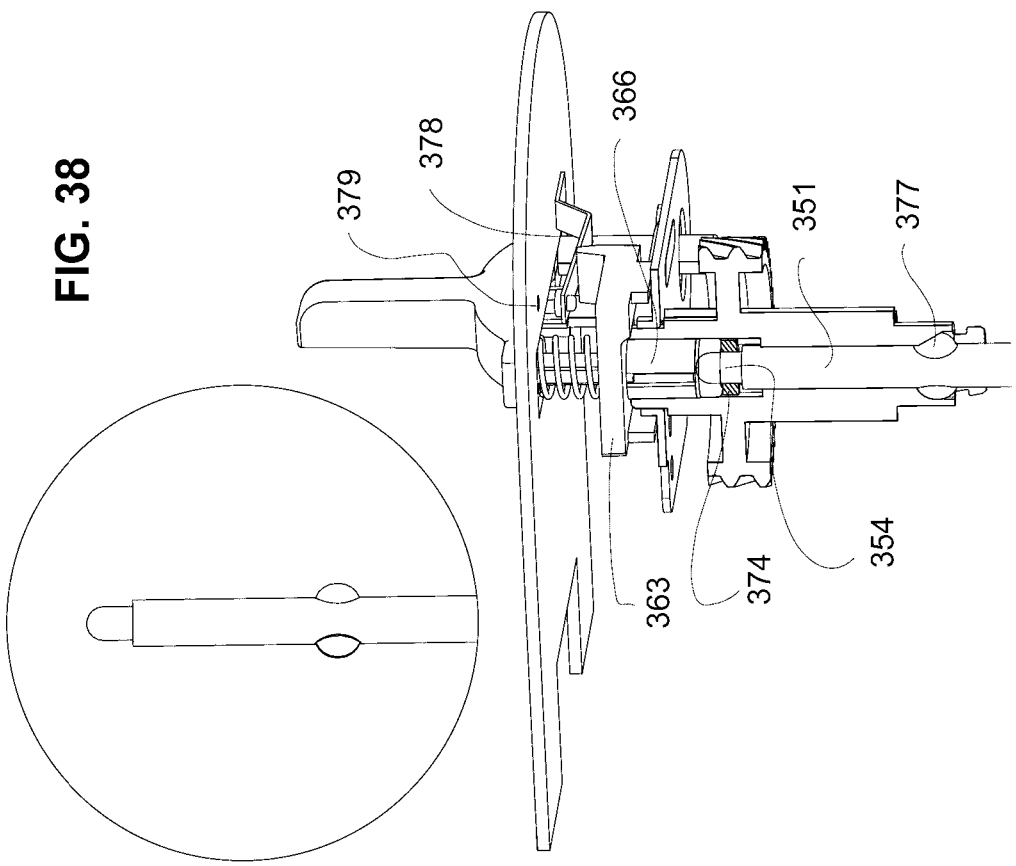

FIG. 38 is a perspective view, partially sectioned, illustrating the effect of a first shaft type on the actuator.

Figure 39:
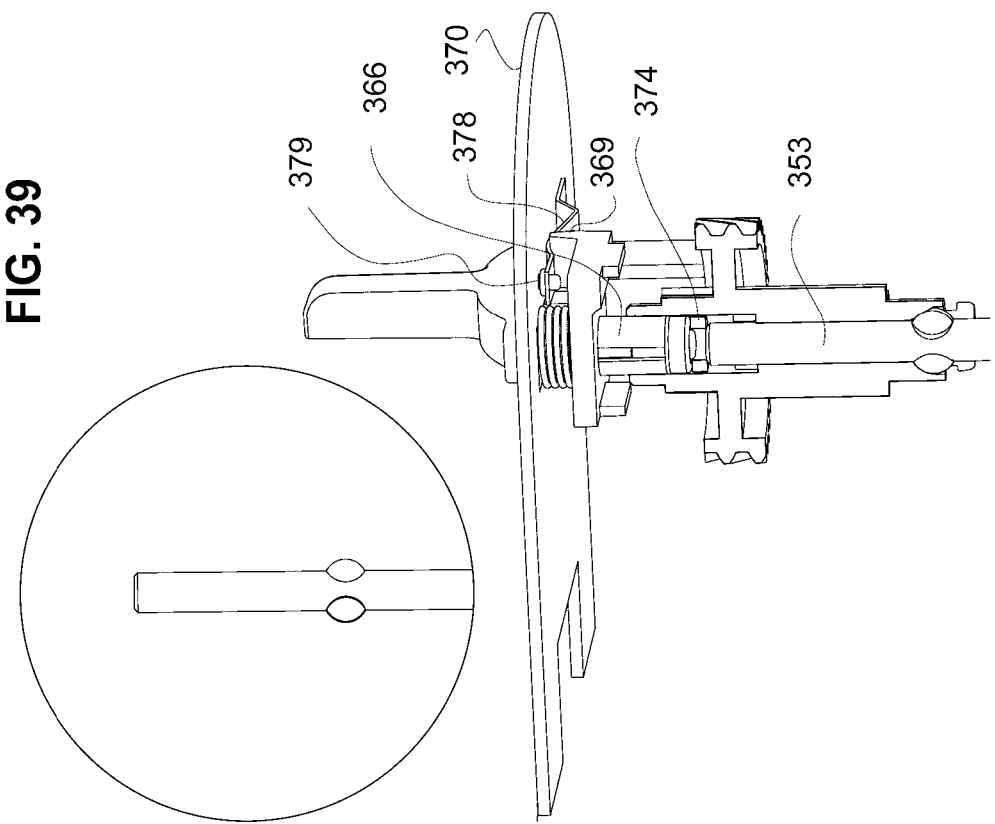

FIG. 39 is a perspective view, partially sectioned, showing the effect of a second shaft type on the actuator.

BEST MODE AND OTHER EMBODIMENTS OF THE INVENTION

As shown in 1, an electrical hand mixer 10 comprises a body 11 within in which is located an electric motor, processor and drive components necessary to rotate the two rotating or other rotating accessories or beaters 12 that are removably retained from a pair of hubs or sockets opening to an underside of the body 11. The body's handle 13 comprises an upright post 14 that extends from a forward portion of the body 11 and joins an inclined grip 15. The rear portion of the grip 15 is supported by a second or rear post 16 that extends from a rear portion of an upper surface of the body 11. A user interface 17 is located in the area where the forward post 14 joins the grip 15. An eject lever or trigger 18 is located on a lower, interior portion of the post 14 where it can be operated by a user's index finger. A concavity or recess 19 is located below the lever or trigger 18. Elongated air vents 20 are located behind the beaters 12 and along or adjacent to a lower edge of the body 11.

Figure 1:
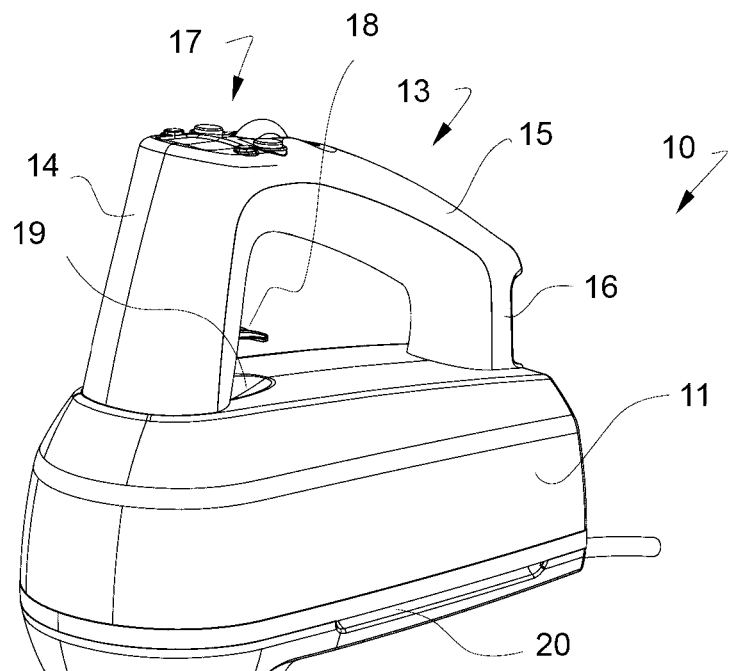
FIG. 1 is a perspective view of a hand mixer.
Figure 2:
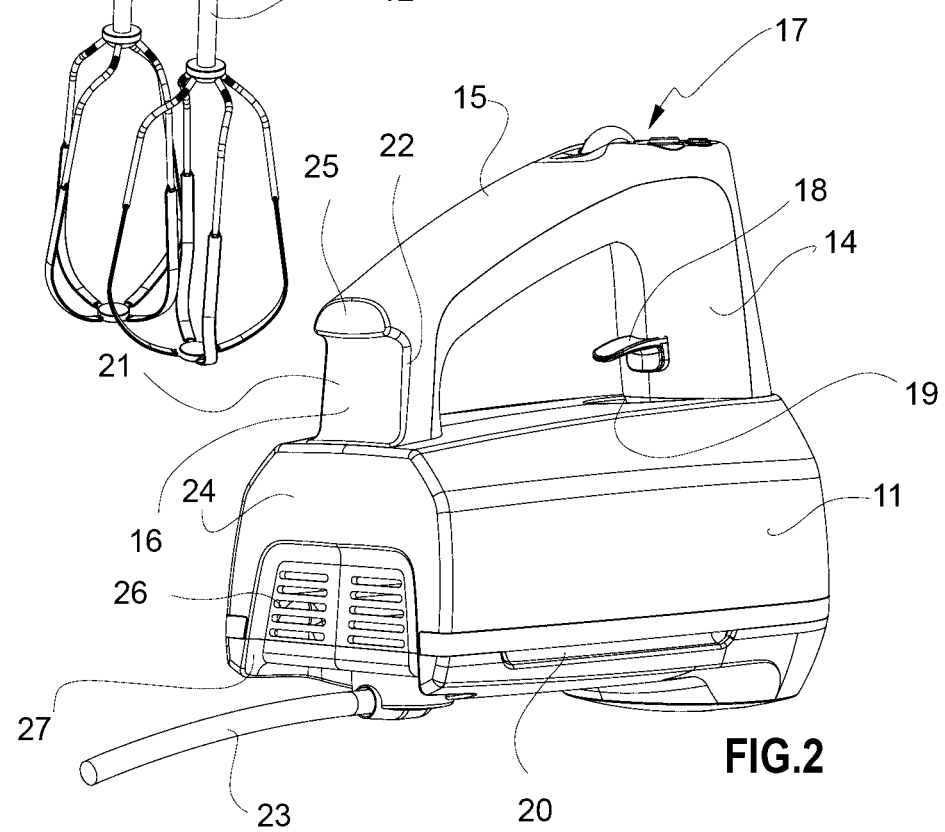
FIG. 2 is a rear perspective view of the hand mixer shown in FIG. 1.
Figure 6:
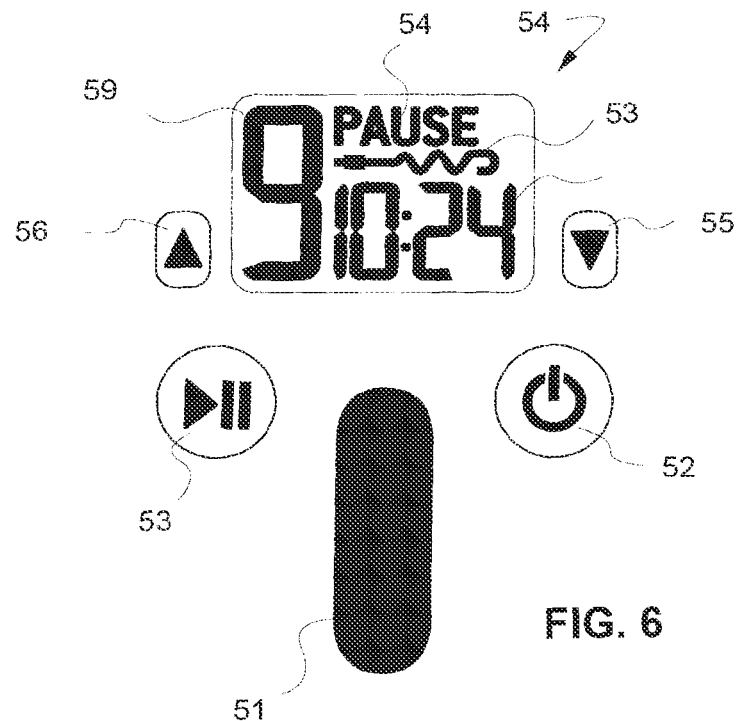
FIG. 6 is a schematic detail of the interface depicted in FIG. 5.

As shown in FIG. 2, a rear surface 21 of the rear post 16 forms an indentation or channel 22 that facilitates a winding of the mixer's electrical cord 23 around the forward and rear posts 14, 16. A rear surface 24 of the body 11 is flat. Vents 26 are recessed with respect to the rear surface. An open end 27 of the "U" shaped recess 28 promotes air flow when the device is upright. The rear end of the handle also features a flat portion 25 that is preferably in the same plane as the flat surface or heel 24 thereby adding to the stability of the mixer when it is resting on a flat surface in the upright orientation.

As shown in FIGS. 3 and 4 the inclined grip 15 of the handle 13 forms an acute angle 31 with reference to a nominal horizontal access 32 of the body 11. As suggested by FIG. 4 the inclination of the grip 15 provides a more natural and comfortable hand position 41 when compared with a grip 15 that is more parallel with the body's horizontal access.

As shown in FIG. 5 the user interface 17 includes, for example, a rotating scroll wheel that acts as a means of speed adjustment. The scroll wheel rotates and can be pushed down, acting like a momentary switch. Pushing down the scroll wheel 51 instructs the processor to boost the motor speed or power so long as the scroll wheel 51 is depressed. In this example, a power on/off switch 52 is provided to the right of the scroll wheel 51. A "pause" button is located to the left of the scroll wheel 51. Both push buttons 52 and 53 are located below a display screen 54. A countdown timer control button 55 is located to the right of the display 54.

Once the countdown timer is activated with the button 55, repeated depression of the button 55 causes additional time to be added to the countdown time. The countdown time is displayed on the screen 54. A button 56 to the left of the display 54 causes an incremental subtraction of time from the active countdown. Depressing the button 56 during a countdown causes the new time to be displayed on the display 54. The display also describes graphic symbols relating to the motor speed, for example, one of the digits 1-9 in accordance with the position of the scroll wheel 51, a symbol 57 to indicate the pause feature has been activated or a symbol 58 which is indicative of one of a variety of the accessories that may be rotatably and removably retained by the mixer.

Figure 7:
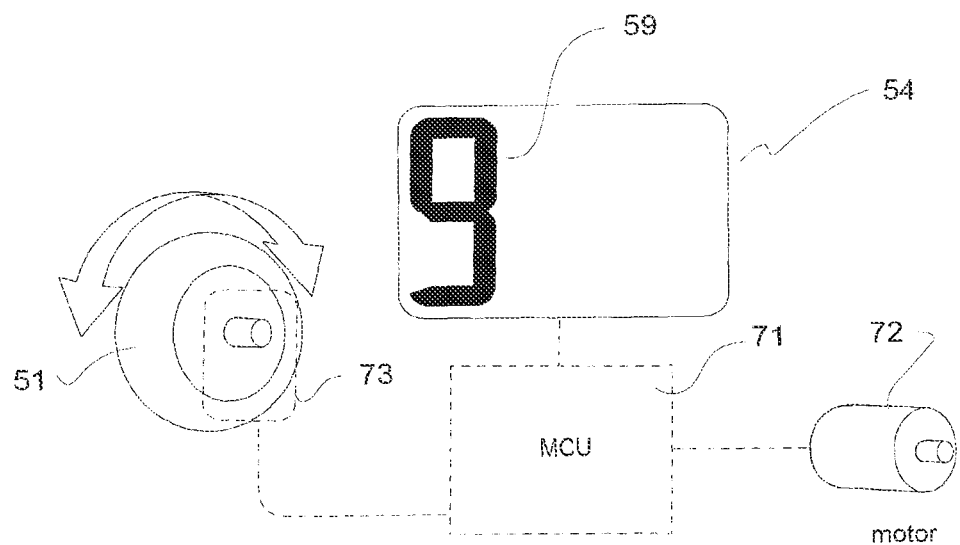
FIG. 7 is a schematic diagram illustrating the interaction between a scroll wheel, sensors, MCU, display and motor.

As shown in FIG. 7, rotation of the scroll wheel 51 results in an interaction with rotation sensors 73 that provide information signals to the mixer's microprocessor control unit (MCU) or "processor" 71. The MCU or processor 71 controls the mixer's motor 72 and drives the mixers display 54. In the example of FIG. 7, the rotational position of the scroll wheel is interpreted by the micro processor as the maximum speed "9" and therefore the numeral "9" 59 is displayed. In this example, the numeral "9" appears in the full height of the display along the left hand margin of the display 54.

As shown in FIG. 8, the scroll wheel 51 is also associated with a momentary switch 81 that detects the scroll wheel's motion in the vertical direction 82. The momentary switch 81 provides a signal to the MCU 71 that causes the MCU to drive the mixers motor 72 at a speed higher than the currently selected speed, preferably, the highest speed the motor can operate. So long as the momentary switch 81 is activated the MCU 71 also causes a symbol or word such as "BOOST" 83 to be displayed on the unit's display 54. In this example, the word "BOOST" is provided in the upper right hand corner of the display 54.

As shown in FIG. 9, one way of providing location signals regarding the rotational position regarding the scroll wheel 51 to the MCU 71 is using an array of magnets 91 and a pair of Hall sensors 92 and 93.

In this example, the magnets, 91 are arranged in a circular array. The magnets 91 are arranged to alternate between a north orientation 94 and a south orientation 95. Thus every north oriented magnet 91 is adjacent to two south oriented magnets 95 and each south oriented magnet 95 is adjacent to two north oriented magnets 94.

In this example, the Hall sensors 92, 93 are located adjacent to the circular array of magnets 91. If the angle between adjacent magnets is represented as X, then the angular spacing between the sensors 92, 93 is preferably a whole integer multiple of X plus ½ X. In this way, the direction of rotation of the scroll wheel 51 can be ascertained by the sensors 73, 92, 93 working in conjunction with the MCU 71. As shown in the example of the FIG. 9(c) one sensor 92 overlays and therefore senses a north oriented magnet 96. Owing to the aforementioned angular spacing of the other sensor 93, it overlays a gap between adjacent north and south magnets 97, 98. When the scroll wheel is rotated counter clock wise as shown in FIG. 9(c) the north oriented magnet 97 is detected by the right sensor 93 and the left sensor 92 is located adjacent to a gap between adjacent magnets. When the scroll wheel is rotated to the right, the right hand sensor detects the south oriented magnet 98 and the left sensor 92 is oriented adjacent to a gap between adjacent magnets and therefore detects no field. Using these relationships, the sensors 92, 93 work with the MCU 71 to detect the direction of rotation of the scroll wheel and therefore provide the MCU with information from which it can adjust upwardly or downwardly, the speed of the motor 72. Simultaneously the MCU can cause the appropriate speed symbol to be depicted in the display 54. One benefit to the device is that the sensors are not overly affected by liquid or food ingress.

As shown in FIGS. 10 and 11, in another embodiment, the rotating scroll wheel 51 is supported on one side by a stub shaft 100 having, for example, a hexagonal end 101 that enters, engages with and drives an encoder 102 that communicates with the mixer's MCU 71. The encoder provides data to the MCU regarding the rotational position of the scroll wheel 51. The stub shaft 100 has an enlarged hub 103 that lies adjacent to the scroll wheel 51. The hub rests on a shoulder of a vertical reciprocating cradle 104. The cradle isolates the wheel. Any liquid or debris entering the open top 113 of the cradle can exit an opening 115 at the bottom of the cradle 115. The opening 115 aligns with a through opening 116 on an underside of the grip. The cradle is supported and oriented on either side by spaced apart and parallel side walls 110, 111. A compression spring or other means of biasing 112 urges the cradle 104 into an upper off position. When the scroll wheel and the cradle that carries it is depressed, a momentary or other switch can be activated (see FIG. 10). In this example, the encoder 102 is stationary and the stub shaft 100 is flexible enough to allow the scroll wheel 51 to be depressed and subsequently return to its original position. In this example, the scroll wheel incorporates a second stub shaft 113 that is also supported for rotation by the reciprocating cradle 104.

The momentary switch (as shown in FIG. 10) can be activated by a stub shaft or lever 105 that is rigidly carried by or attached to the vertically reciprocating cradle 104.

As shown in FIG. 12, the mixer's electrical cord 120 is affixed to a pivoting hub 121 that is supported by an underside of the mixer's body. The rotating hub 121 lies within a recess 122 allowing the angle that the cord makes with the body are varied without stressing the cord. The underside also features a pair of spaced apart openings 123, 124 that are adapted to receive the mixer's motorised hubs from above and the mixer's beaters or accessories from below. A source of illumination such as an LED 125 is located along the axial mid-line of the underside 126. In this example, the source of illumination 125 is located between the sockets 123,124 and on, or adjacent to the transverse axis 127 that passes through the centre of each of the sockets 123, 124.

As shown in FIGS. 13 (a)-(b), both beaters or accessories are simultaneously ejected by the body by a mechanism which is driven by a lever or trigger 131. In this example, the pivoting trigger features a circular portion 131 (or arc shape 130, see FIG. 13 (a)) adapted to receive a human finger. Pulling the trigger 131 upward drives the ejection mechanism 132 downward. The ejection mechanism 132 impinges on an upper extent of both beaters and thereby drives them out of engagement with the hand mixer. The ejection mechanism 132 includes a yoke 133 having two arms 134. Each arm (for example) terminates in a pusher with a central opening 135.

As shown in FIG. 14, the illuminator 125, shines downward and being forward of the beaters 140 illuminates the interior of a bowl 141 in which the mixer is operating. FIG. 14 also illustrates that an air vent 141 maybe located behind the beaters 140 and therefore radiantly outward of the rim of the bowl 141. In this way, air entering the vent 141 is not laden with food powders or particles that maybe entrained in the air above the beaters 140.

As shown in FIGS. 15 and 15 (a), an air cooling or vent openings comprise one or a pair of horizontal slots 141 located along the parting line between the upper and lower moldings of the mixer body. Air 150 enters the vent 141 and from there enters a generally horizontal and internal flow channel 151 that leads into the intake opening 152 of an electric fan 153 that is mounted on a horizontal axis 154. Preferably, the fan is located adjacent to the front 155 of the mixer body, directing air rearwardly 156 for the purpose of cooling the beaters gearing or arrangement 157 and the processor and related circuits 159. Air is ejected 160 from the rear vents located on the flat rear surface or heel of the mixer.

As shown in FIG. 16, the mixer 161 is adapted to receive any number of different rotating accessories 162. An accessory can be detected or distinguished from a conventional beater by the physical characteristics of its shaft. A sensor arrangement detects which accessory has been inserted and a corresponding signal or switch signal is provided to the MCU 163. The MCU 163 causes the appropriate icon, image or text to appear on the mixer's display 164. The MCU or processor is also adapted to alter the speed of the motor 165 or characteristics of the motor 166 (or other features such as a light) such as speed, torque, power limit or speed profile or other features in accordance with which accessory 162 is detected. This can be done by the processor directly controlling the motor or altering the way a user control on the interface operates. For example, upon detecting a particular accessory the processor can increase or decrease a speed range. This can be understood with reference to the user's speed selection control, for example the scroll wheel. The speed range available for control, being the range between the minimum and maximum speed can be increased or decreased, without changing the range of rotational motion of the scroll wheel. In another example the entire range is altered, for example by multiplying or dividing a speed associated with all scroll wheel positions (when no accessory is detected) by a constant valve. Thus the range of speeds available, the particular speeds associated with scroll wheel (or other controller) settings, the display of illumination, or processor response to the mixer's sensors may all be controlled, altered, modified or deleted when an accessory is detected or discriminated from a stand or "default" beater.

As shown in FIG. 17 a rotating accessory 162 for a mixer has a main shaft 170. The shaft may be provided with a pair of opposed and integral tabs 171 as is common practice. An accessory may have a circumferential groove 172 for the purpose of an engaging a cooperating detent mechanism located in the mixer body. As suggested by FIG. 17 different accessories 173, 174 etc can have one or more grooves in different locations. Grooves of different sizes and locations can be recognised by the mixer. Recognition of distinct accessories can be used by the MCU 163 for the purpose of motor and display control as suggested with reference to FIG. 16. As shown in FIG. 17, by providing grooves in different locations 175, 176 along the length of the shaft 170 or by providing different numbers of grooves along the length of the shaft, mechanisms such as depicted in FIG. 18 may be used to provide identification or recognition signals to the MCU 163.

As shown in FIG. 18, one or more accessory recognition sensors 180 may be provided within the interior 181 of the mixer body. In the example of FIG. 18, three recognition sensors 180 are provided. Each one comprises a follower or reciprocating ball detent mechanism 182 coupled with an electronic switch 183. When the detent mechanism is fully extended 182 it sends the first signal or switch state but when the detent mechanism is retracted because of the absence of a groove, a different signal or switch state is provided to the MCU 163.

A different means of recognising different accessories is suggested by FIGS. 19-21. As shown in FIG. 19, the shaft 190 of an accessory for a hand mixer can have a protrusion, extension or stub shaft 191 that extends centrally of a shoulder 192. When different accessories have protrusions 191 of different lengths they can be distinguished, for example by a sensor of the type depicted in FIG. 20.

As shown in FIG. 20, the protrusion or stub shaft 191 can impinge on a mechanical sensor, 200 (or not) and thus be identified and distinguished from other accessories or standard beaters. In the example of FIG. 20, the sensor 200 has a follower in the form of a pivoting lever arm or such 201 that makes contact with a domed upper surface 202 of the protrusion 191. In the example of FIG. 20, the amount of displacement of the lever 201 when the accessory 190 is fully inserted determines the signal output of the sensor 200 that is communicated to the MCU. FIG. 20 also illustrates a collar 203 that forms a part of the mechanical ejection mechanism (see FIG. 13 (*b*)) that also includes the lever or trigger 18, 131. Raising the trigger has the effect of lowering the collar 203 and thus disengaging the accessory or accessories 190 from the mixer.

In the example of FIGS. 21 and 21 (*a*), an array of optical sensors 210 is used to determine the length of the extension or protrusion 191 and thus the identity of the accessory 190. As suggested by FIG. 21(*a*), each sensor 211 is coupled with an optical emitter 212. The extension 191 will block the light emitted by none, 1 or more of the emitters to 12 and only emitters that are not obscured by the extension 191 will be detected by their counterpart detectors 211. In this way, the appropriate identification signal can be provided to the MCU from the array 210.

As shown in the FIGS. 22 and 22 (*a*), a hand mixer 222, particularly one with the capacity to detect and distinguish accessories as previously described may be used to drive accessories such as a food processor 220 (with optional internal gearbox 225) or a stick mixer to 221 (with optional gearbox 226). Where such accessories are driven by the hand mixer 222, the accessory can couple to one or both driving sockets to the mixer 222. The working spindle 227 of the food processor 220 is driven from the top 228 and is supported by a lower stub shaft 229 carried by the bowl 229 (*a*). Each accessory has an input drive spindle or shaft 223, 224 that is unique in its characteristics and can thus can be distinguished by the sensors and micro processor in the mixer 222. In this way the motor output speed at range, maximum speed or other motor characteristics can be tailored by the MCU to the particular accessory being used.

As shown in FIG. 23 a hand mixer can be provided with a pause feature. As suggested by FIG. 5, when the motor and timer are running 230, activation of the pause button 55 causes both timer and the motor to stop 231. The mixer's light may also be turned off by the MCU or processor. When the pause button is pressed again 232, the timer resumes and the motor returns to the last original setting, optionally ramping up to that speed over an interval of, for example 0.5 seconds 233. The time to reach this speed or the "ramp" or speed profile may be tailored by the MCU to the particular accessory that is inserted and may be inserted in the mixer. The illuminator may be resumed as well.

As shown in FIGS. 24-26, an accessory to 24*o* for a hand mixer may incorporate a conventional main shaft 241 or utilise a special configured shaft as suggested in FIGS. 17-21 (*a*). In this example, the beating elements or tines 242 are four in number and are all attached (for example) to common hub 243 located at a lowest end of the shaft 241. In this example, each tine 242 is over moulded around at least a lower extent 243. The over-moulding is a suitable polymer that reduces the noise of the beater when used in a metal bowl and preferably incorporates an integral scraping edge or rib 244. In this example the over moulded portion, comprises the lower half of each tine and the scraping rib 224 extends radially from each moulding. In this example each of the tines is raked rearwardly 246, this shape tending to drive ingredients being mixed the bowl or the container towards the bottom.

As shown in FIG. 27 a hand mixer 270 may be provided with snap-on carry case 271 for accessories. In this example, the carry case has a rounded front end 272 that compliments the front of the mixer 273. A vertical rib 274 integral with the front of the case optionally supports the front end of the mixer. A flair or pilot 275 may be used to guide the front end of the mixer into correct mounting orientation with respect to the case. In this example the case has integral horizontal ribs 276 that engage with the air vents 277 that have previously been described.

As shown in FIG. 28-31 when the ribs 301 are inserted into the vents 277 the mixer is effectively retained by the case. In this example, the ribs 301 engage essentially the full length of the vent. The shape of the case essentially conforms to the mixer but has, when the mixer is attached, a rearward opening 281 in to which the mixers cord may be inserted or accommodated.

As shown in FIGS. 29-31 the side wall 302 of the case 303 flexes laterally 304 when the mixer 305 is inserted to or withdrawn with engagement with the case. A lower surface 306 of the mixer, adjacent the edge of the under surface, is angled or tapered to cooperate with a complimentary or pilot 307 formed on an upper surface of the rib 301.

As shown in FIG. 31, the underside of a rib 301 tapers and cooperates with the contours of the mixer body 310 to facilitate withdrawal of the mixer from the case. In this example, an upper margin 308 of the air intake 277 carries a trim moulding.

As shown in FIG. 14, the illuminator 125, being forward of the beaters 140 illuminates the interior of a bowl 141 in which the mixer is operating. FIG. 14 also illustrates that an air vent 141 may be located behind the beaters 140 and therefore radially outward of the rim of the bowl 141. In this way, air entering the vent 141 is not laden with food powders or particles that are entrained in the air about the beaters 140.

As shown in FIG. 15, the air vent opening 141 comprises one or a pair of horizontal slots located along a lower margin of the mixer body. Air 150 enters the vent 141 and from there enters a horizontal and internal channel 151 that leads into the intake opening 152 of an electric fan 153 that is mounted on a horizontal axis 154. Preferably, the fan is located adjacent to the front 155 of the mixer body, directing air rearwardly 156 for the purpose of cooling the beater's gearing arrangement 157, the electric motor 158 and the mixer's electrical circuitry and processor 159. Air is ejected 160 from the rear vents located on the flat rear surface or heel of the mixer. As shown in FIG. 16, a mixer 161 is adapted to receive any number of different rotating accessories 162. A sensor arrangement detects which accessory has been inserted and a corresponding signal is provided to the MCU 163. The MCU 163 causes the appropriate icon, image or text to appear on the mixer's display 164. The MCU is also adapted to alter the speed of the motor 165 or characteristics of the motor 166 such as speed, torque, power profile or other features in accordance with which accessory 162 is detected.

As shown in FIG. 17, a rotating accessory 162 for a mixer has a shaft 170. The shaft may be provided with a pair of opposed and integral tabs 171 as is common practice. Conventionally, such an accessory will have a circumferential groove 172 for the purpose of engaging a cooperating detent mechanism located in the mixer body. As suggested by FIG. 17, different accessories 173, 174 etc. can have grooves and different locations or grooves of different sizes by which each accessory can be recognised by the mixer. Recognition of distinct accessories can be used by the MCU 163 for the purpose of motor and display control as suggested with reference to FIG. 16. As shown in FIG. 17, by providing grooves in different locations 175, 176 along the length of the shaft 170 or by providing different numbers of grooves along the length of the shaft, mechanisms such as depicted in FIG. 18 may be used to provide identification or recognition signals to the MCU 163.

As shown in FIG. 18, one or more recognition sensors 180 may be provided within the interior 181 of the mixer body. In the example of FIG. 18, three recognition sensors 180 are provided. Each one comprises a reciprocating ball detent mechanism 182 coupled with an electronic switch 183. When the detent mechanism 182 is fully extended it sends a first signal but when the detent mechanism is retracted because of the absence of a groove, a different signal is provided to the MCU 163.

A different means of recognising different accessories is suggested by FIGS. 19-21. As shown in FIG. 19, the shaft 190 of an accessory for a hand mixer can have a protrusion, stem or stub shaft 191 that extends centrally of a shoulder 192. When different accessories have protrusions 191 of different lengths, they can be distinguished, for example by a mechanism of the type depicted in FIG. 20.

As shown in FIG. 20, the protrusion or stub shaft 191 can impinge on a mechanical sensor 200 and thus be identified. In the example of FIG. 20, the sensor 200 has a pivoting lever arm 201 that makes contact with a domed upper surface 202 of the protrusion 191. In the example of FIG. 20, the amount of displacement of the lever 201 when the accessory 190 is fully inserted determines the signal output of the sensor 200 that is communicated to the MCU. FIG. 20 also illustrates a collar 203 that forms a part of a mechanical ejection mechanism that also includes the lever or trigger 18, 131. Raising the trigger has the effect of lowering the collar 203 and thus disengaging the beaters or accessories.

In the example of FIG. 21, an array of optical sensors 210 is used to determine the length of the extension or protrusion 191 and thus the identity of the accessory 190. As suggested by FIG. 21 (a), each sensor 211 is coupled with an optical emitter 212. The extension 191 will block the light emitted by none, one or more of the emitter 212 and only emitter's that are not obscured by the extension 191 will be detected by their counterpart detectors 211. In this way, the appropriate signal can be provided to the MCU.

As shown in FIG. 22, a hand mixer, particularly one with the capacity to detect and distinguish accessories as previously described may be used to drive an accessory such as a food processor 220 or stick mixer 221. Where such accessories are being driven by the hand mixer 222, the accessory can couple to one or both of the driving sockets of the mixer 222. Each accessory has an input drive spindle 223, 224 that is unique in its characteristics and can thus be distinguished by the sensors and microprocessor in the mixer 222. In this way, the motor output speed and range, maximum speed or other motor characteristic can be tailored by the MCU to the particular accessory being used.

As shown in FIG. 23, a hand mixer can be provided with a pause feature. As suggested by FIG. 5, activation of a pause button 53 particularly when the motor is governed by the MCU's timer 230 causes both the timer and the motor to stop 231. When the pause button is pressed again 232, the timer resumes and the motor returns to the last or original speed setting, ramping up to that speed over an interval of, for example, 0.5 seconds 233. The time to reach the speed or the "ramp" or speed profile may be tailored to the particular accessory that is inserted in or detected by the mixer.

As shown in FIGS. 24-26, an accessory 240 for a hand mixer may incorporate a conventional main shaft 241 or utilise a specially configured shaft as suggested by FIGS. 17-21 (a). In this example, the beating elements or tines 242 are four in number and are all attached to a common hub 243 located at a lowest end of the shaft 241. In this example, each tine 242 is over-moulded around at least a lower extent 243. The over-moulding is a suitable polymer that reduces the noise of the beater when used in a metal bowl and preferably incorporates an integral scraping blade 244. In this example, the over-moulded portion comprises the lower half of each tine and the scraping blade extends radially from each over-moulding. In this example, each of the tines is raked rearwardly 246, this shape tending to drive ingredients being mixed down the side of the bowl or container toward the bottom.

As shown in FIG. 27, a hand mixer 270 may be provided with a snap-on carry case 271 for accessories. In this example, the carry case has a rounded front end 272 that compliments the shape of the front of the mixer 273. A vertical rib 274 integral with the front of the case optionally supports a front end 273 of the mixer. A flair or pilot ramp 275 may be used to guide the front end of the mixer into correct mounting orientation with respect to the case. In this example, the case has integral horizontal ribs 276 that engage with the air vents 277 that have been previously described. Each rib 276 has an inverted "U" shape thus presenting an outwardly directed edge 278 that can be gripped for the purpose of increasing the spacing between the ribs 276 allowing the mixer to be withdrawn from the case. As shown in FIG. 28, when the ribs are inserted in to the vents 277, the mixer is effectively retained by the case. In this example, the ribs 276 engage essentially the full length of the vent 277. The shape of the case essentially conforms to the mixer but has, when the mixer is attached a rearward opening 281 into which the mixer's cord may be inserted or accommodated.

As shown in FIGS. 29-31, the rib 301 that forms the upper margin of a sidewall 302 of the case 303 flexes laterally 304 when the mixer 305 is inserted to or withdrawn from engagement from the case. A lower surface 306 of the mixer, adjacent the edge of the under surface is angled or tapered to cooperate with a complimentary taper or pilot 307 formed on an upper surface of the rib 301. In this example, an upper margin 308 of the air intake 277 carries a polymeric moulding that cushions the area of contact between the case and the mixer's body.

As shown in FIGS. 32-34 an underside 320 of a hand mixer can be provided with a source of illumination comprising one or more individual illuminators 321. The individual illuminators may be flush with the underside 320 or may protrude 322. In some examples the illuminators 321 are recessed 323 with respect to the underside 320. Each illuminator may be, for example, an LED illuminator having an integral lens, or an illuminator having a separate lens 324. An illuminator may have a lighting element 325 separate from its lens 324. A lens 324 may be used to point or direct the light, focus the light or defuse it.

As shown in FIG. 32, the underside 320 may be provided with one or more illuminators 321. In the example of FIG. 33, two illuminators 330, 331 are located between the spaced apart openings 332 that are adapted to receive the mixer's beaters and the forward end to 333 of the mixer. In this example, a third illuminator 334 is located along the longitudinal midline of the mixer and between the openings 332 and the back end 335 of the mixer. An additional illuminator 336 is located along the longitudinal midline and closer to the back end 335 than the other illuminators 330, 331, 334.

As shown in FIG. 34 each of the illuminators 321, can be pointed, aimed or focused separately so as to converge in the area 340 that the beaters or accessories are working. Having a plurality of illuminators providing different direction light paths 341 can reduce shadows in the area of illumination 340. Further, the illuminators need not provide only white light. Illuminators using coloured lenses or housings 324, 322 can provide illumination in a non-white colour that helps the user reveal the shape and contrast of the food being mixed. Multi-colour LEDs (colour changing) can provide a variety of different colours from a single illuminator. Multi-coloured LEDs can be controlled so as to change the colour of the illumination they provide by utilising the scroll wheel 51 in conjunction with the display 54 and the device's processor. A separate button, slider or controller 57 on the interface (see FIG. 5) may be used to independently control each of the illuminators or control them in unison. The intensity of colour or flashing pattern of the illuminators can be varied by the processor in response to the kind of accessory that is detected.

Typically, a mixer has a range of user selectable speed settings. When an accessory such as a dough hook is detected, the processor can reduce each selected speed over the range, or the speeds associated with each selected position by, for example, one half. It will be understood that the accessory detection can be used to alter the speed of the motor, or its range as required, either by increasing it or decreasing it, disabling all but one or more selected speeds or in any other manner consistent with the detected accessory.

As shown in FIG. 35 a first accessory or beater 350 has a first shaft type 351 and a second rotating accessory 352 has a second shaft type 353. The first shaft type is characterised by a recognition tip 354 having a diameter that is less than the diameter of the main extent of the shaft 351. In this example, the effective length or length from the torque transmitting tabs 355 to the very terminal ends 356 of each shaft type are the same. In this example, the first shaft type 351 is associated with a beater head 357 and the second shaft type 353 is associated with a dough hook 358.

As shown in FIG. 36, a beater or accessory ejection mechanism comprises a "Y" shaped yoke 360 having downward extending parallel arms 361, 362. An actuator 363 reciprocates on one of the arms 361. The bore of the actuators 363 has one or more keyways 364 that slide on keys 365 formed on an arm 361. This prevents the actuator 363 from rotating. The actuator 363 further comprises a downward extending sleeve 366. The sleeve has a bore or recess 367 that receives the recognition tip 354 of one shaft type but does not receive the larger terminal end 356 of the second shaft type 353. In preferred embodiments, the sleeve 366 is terminated with a circumferential metallic cap 368 for minimising wear on the actuator 363 under the influence of the rotating shafts. The actuator 363 also incorporates a projecting finger 369 that extends above an upper surface of the actuator.

As shown in FIG. 37, the mixer's printed circuit board 370 has a rectangular opening 371 that allows the parallel arms 361, 362 of the yoke 360 to extend through it. The arm with the key 365 passes through a compression spring 372 and is adapted to enter the bore of the sleeve 366. In this example, the left geared hub 373 has a central bore that receives a bushing such as a sintered bronze bushing 374. The bushing 374 has a central opening that is adapted to receive the tip of an accessory 354. The opening cannot receive the upper extent of the second shaft type 353. The lower extent of the hub 373 comprises a slotted coupling 375 into which a shaft 376 can be inserted. Tabs 377 on the shaft enter the receiving slots in the coupling 375. When the actuator 363 is acted on by a shaft of the second type 353 (but not the first shaft type), it moves toward the printed circuit board 370 and is resisted by the compression spring 372. The finger 369 will make contact with an electrical switch element 378 when acted on by the second shaft type 353. The resilient switch element 378 will touch an electrical contact 379 on an underside of the printed circuit board 370 and complete a circuit. The completion of the circuit represents discrimination between the first and the second shaft types and can be used to detect which type of shaft has been fully inserted into the hub 373.

As shown in FIG. 38, a shaft of the first type 351 having a tip 354 of reduced diameter will pass through the bushing 374 and into the bore of the actuator's sleeve 366. In this orientation, the tabs 377 are fully inserted into the hub's slots and thus the shaft is deemed fully inserted. In this orientation, the actuator 363 is not acted on by the shaft 351 and thus the switch element 378 does not touch the electrical contact 379. However, as shown in FIG. 39, a shaft of the second type 353, when fully inserted, will lift the bushing 374 and drive it toward the actuator's sleeve 366. This in turn will drive the sleeve and actuator toward the printed circuit board 370. This causes the actuator's finger 369 to move the electrical switching element 378 into engagement with the contact 379 on the underside of the printed circuit board 370. This completes an electrical circuit that is detected by the device's processor. The detection of this switching condition or its opposite (as shown in FIG. 38) indicate to the processor which type of shaft has been inserted. The processor can then control the motor, the lights or other aspects of the operation of the mixer in accordance with which shaft type, and therefore which accessory type, has been inserted into the hubs.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Unless specifically stated otherwise, as apparent from the following discussions, it is appreciated that throughout the specification discussions utilizing terms such as "processing," "computing," "calculating," "determining" or the like, refer to the action and/or processes of a microprocessor, controller or computing system, or similar electronic computing or signal processing device, that manipulates and/or transforms data.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention.

While the present invention has been disclosed with reference to particular details of construction, these should be understood as having been provided by way of example and not as limitations to the scope or spirit of the invention.

What is claimed is:

1. A hand held mixing device comprising a body with a pair of openings providing access to a pair of hubs that are adapted to receive a pair of accessories, the hand held mixing device further comprising:
   an array of sensors disposed and aligned along a hub, the array of sensors being adapted to differentiate between a first accessory having a first shaft and a second accessory having a second shaft by detecting a physical difference between the first and the second shaft when received in the hub;
   the array of sensors communicating a signal to a processor, wherein a presence of a physical attribute of the first or second shaft causes one of the sensors to send a first signal or a first switch state to the processor, and wherein an absence of a physical attribute of the first or second shaft causes one of the sensors to send a second signal or a second switch state to the processor, wherein the first signal or first switch state is different to the second signal or second switch state;
   the processor altering an operation of the hand held mixing device in response to the signal communicated to the processor; and
   the hand held mixing device further including an ejection mechanism for ejecting the first and second shafts from the pair of hubs, the ejection mechanism being driven by a lever directly operable by a user.

2. The hand held mixing device of claim 1, wherein:
   the signal communicated to the processor is made by an electrical switch that communicates a first switch state to the processor when the first shaft is received in a selected one of the pair of hubs and that communicates a second switch state to the processor when the second shaft is received in the selected one of the pair of hubs.

3. The hand held mixing device of claim 2, wherein:
   the electrical switch includes a mechanical follower which changes position in response to the first and second shafts, the change in position causing a change between the first and second switch states.

4. The hand held mixing device of claim 2, wherein:
   the at least one sensor includes an optical emitter for emitting a light and an optical sensor for detecting the light emitted by the optical emitter; and
   the electrical switch is activated in response to whether the first or second shaft is obscuring the light that is being emitted from the optical emitter toward the optical sensor.

5. The hand held mixing device of claim 1, wherein:
   the operation altered is a motor speed of the first or second accessory based on a user selection.

6. The hand held mixing device of claim 1, wherein:
   the operation altered is a display of information on a user interface.

7. The hand held mixing device of claim 3, wherein the mechanical follower is a ball detent mechanism.

8. The hand held mixing device of claim 3, wherein the mechanical follower is a pivoting lever arm.

9. The hand held mixing device of claim 1, further including a source of illumination disposed in the body for illuminating an area below the accessories.

10. The hand held mixing device of claim 1, wherein the body includes one or more air vents for cooling internal components within the body.

11. The hand held mixing device of claim 1, wherein the ejection mechanism is driven by upward movement of the lever.

12. The hand held mixing device of claim 11, further including a handle, and wherein the lever is disposed underneath the handle.

13. The hand held mixing device of claim 1, wherein the ejection mechanism is arranged to eject two accessories at a time.

14. The hand held mixing device of claim 1, wherein the device further includes a feature which upon activation ceases operation of the device and upon reactivation returns operation of the device to a prior setting.

15. The hand held mixing device of claim 6, further comprising a sensor arranged to detect an identity of the accessory, and to communicate a signal to the user interface, and wherein the user interface displays an icon, image, or text indicative of the identified accessory.

16. A hand held mixing device, comprising:
   a body with a first opening having a first drive hub and a second opening having a second drive hub, the first and second drive hubs each arranged to receive a first accessory and a second accessory;
   a first series of sensors disposed in and aligned along the first drive hub and a second series of sensors disposed in and aligned along the second drive hub, the first and second series of sensors each arranged to differentiate between the first accessory having a first shaft and the second accessory having a second shaft by detecting a physical difference between the first shaft and the second shaft when received in either the first drive hub or the second drive hub;

each of the first and second drive hubs arranged to drive the first accessory and the second accessory;

the first and second series of sensors arranged to communicate a signal to a processor;

the processor arranged to alter an operation of the hand held mixing device in response to the signal communicated to the processor by the first and second series of sensors;

the hand held mixing device further including an ejection mechanism for ejecting the first and second shafts from the first and second drive hubs, the ejection mechanism being driven by a lever operable by a user.

17. The hand held mixing device of claim 16, wherein each of the first and second series of sensors is a mechanical sensor configured to detect a groove or protrusion on the first or second shaft.

18. The hand held mixing device of claim 17, wherein the mechanical sensor includes a ball detent mechanism.

19. The hand held mixing device of claim 17, wherein the mechanical sensor includes a pivoting lever arm.

20. The hand held mixing device of claim 16, wherein each of the first and second series of sensors is an optical sensor configured to detect a length of the protrusion on the first or second shaft.

21. A hand held mixing device having a body with a pair of openings providing access to a pair of hubs that are adapted to receive a pair of accessories, the hand held mixing device comprising:

at least one sensor for differentiating between a first accessory having a first shaft and a second accessory having a second shaft by detecting a physical difference between the first and the second shaft when received in a hub;

a user interface configured to allow user selection of a motor speed of the first or second accessory;

the at least one sensor communicating a signal to a processor;

the processor altering an operation of the hand held mixing device in response to the signal communicated by the at least one sensor; and wherein the processor is further arranged to alter the operation of the hand held mixing device independent of the user selection made on the user interface.

22. The hand held mixing device of claim 21, wherein the user interface includes a scroll wheel.

23. The hand held mixing device of claim 21, wherein altering the operation of the hand held mixing device comprises altering the motor speed.

24. The hand held mixing device of claim 21, wherein the at least one sensor comprises a mechanical sensor or an optical sensor.

25. The hand held mixing device of claim 24, wherein the mechanical sensor comprises a ball detent mechanism or a pivoting lever arm.

* * * * *